US008599013B1

(12) United States Patent
Baron, Sr.

(10) Patent No.: US 8,599,013 B1
(45) Date of Patent: Dec. 3, 2013

(54) SYSTEM AND METHOD FOR PROVIDING ENVIRONMENTAL INFORMATION TO A WIRELESS TRANSMITTER COVERAGE AREA

(75) Inventor: Robert O. Baron, Sr., Huntsville, AL (US)

(73) Assignee: Baron Services, Inc., Huntsville, AL (US)

( * ) Notice: Subject to any disclaimer, the term of this patent is extended or adjusted under 35 U.S.C. 154(b) by 129 days.

(21) Appl. No.: 12/256,023

(22) Filed: Oct. 22, 2008

Related U.S. Application Data

(63) Continuation-in-part of application No. 12/040,295, filed on Feb. 29, 2008, now abandoned, which is a continuation-in-part of application No. 11/495,078, filed on Jul. 28, 2006, now Pat. No. 7,847,708.

(60) Provisional application No. 60/721,701, filed on Sep. 29, 2005.

(51) Int. Cl.
*G08B 1/08* (2006.01)

(52) U.S. Cl.
USPC .............. 340/539.28; 340/439.1; 340/539.11; 340/539.13; 340/539.26; 340/539.27; 340/905; 340/995.1; 340/995.12; 340/995.14; 340/995.17; 702/3; 701/423

(58) Field of Classification Search
USPC ............................................. 340/905, 539.28
See application file for complete search history.

(56) References Cited

U.S. PATENT DOCUMENTS

| | | | |
|---|---|---|---|
| 5,265,024 A | 11/1993 | Crabill et al. | |
| 5,898,680 A | 4/1999 | Johnstone et al. | |
| 6,018,699 A | 1/2000 | Baron, Sr. et al. | |
| 6,112,074 A | 8/2000 | Pinder | |
| 6,112,075 A | 8/2000 | Weiser | |
| 6,177,873 B1 | 1/2001 | Cragun | |
| 6,204,761 B1 | 3/2001 | Vanderable | |
| 6,209,026 B1 | 3/2001 | Ran et al. | |
| 6,240,369 B1 | 5/2001 | Foust | |
| 6,243,647 B1 | 6/2001 | Berstis et al. | |
| 6,252,539 B1 | 6/2001 | Phillips et al. | |
| 6,255,953 B1 | 7/2001 | Barber | |
| 6,275,774 B1 | 8/2001 | Baron, Sr. et al. | |
| 6,289,277 B1 | 9/2001 | Feyereisen et al. | |
| 6,295,001 B1 | 9/2001 | Barber | |
| 6,297,766 B1 | 10/2001 | Koeller | |
| 6,317,686 B1 | 11/2001 | Ran | |
| 6,343,255 B1 | 1/2002 | Peek et al. | |
| 6,351,218 B1 | 2/2002 | Smith | |
| 6,404,880 B1 | 6/2002 | Stevens | |

(Continued)

*Primary Examiner* — Tai T Nguyen
*Assistant Examiner* — Ojiako Nwugo
(74) *Attorney, Agent, or Firm* — Frank M. Caprio; Stephen H. Hall; Bradley Arant Boult Cummings LLP

(57) ABSTRACT

The present system and methods provides for distribution of weather and other environmental information to remote users within a wireless transmitter coverage area. The system and method assigns meteorological data to a plurality of cells, each corresponding to a communication range of a wireless transmitter. The data is then distributed by the appropriate wireless transmitter to all users within its coverage area. The system and method does not distribute information to a particular user based upon a known communication address, user profile, or identification, but rather is directed to any user falling within the communications range of the wireless transmitter. By indiscriminate distribution of reportable events, the system provides timely, site-specific information without requiring the location of the remote units.

41 Claims, 20 Drawing Sheets

(56) References Cited

U.S. PATENT DOCUMENTS

| | | |
|---|---|---|
| 6,462,665 B1 | 10/2002 | Tarlton et al. |
| 6,490,525 B2 | 12/2002 | Baron, Sr. et al. |
| 6,493,633 B2 | 12/2002 | Baron, Sr. et al. |
| 6,498,987 B1 | 12/2002 | Wilt et al. |
| 6,505,123 B1 | 1/2003 | Root et al. |
| 6,590,529 B2 | 7/2003 | Schwoegler |
| 6,603,405 B2 | 8/2003 | Smith |
| 6,646,559 B2 | 11/2003 | Smith |
| 6,650,972 B1 | 11/2003 | Robinson et al. |
| 6,654,689 B1 | 11/2003 | Kelly et al. |
| 6,700,482 B2 | 3/2004 | Ververs et al. |
| 6,753,784 B1 | 6/2004 | Sznaider et al. |
| 6,754,585 B2 | 6/2004 | Root et al. |
| 6,823,263 B1 | 11/2004 | Kelly et al. |
| 6,826,481 B2 | 11/2004 | Root et al. |
| 6,829,536 B2 | 12/2004 | Moore |
| 6,836,730 B2 | 12/2004 | Root et al. |
| 6,845,324 B2 | 1/2005 | Smith |
| 6,985,813 B2 | 1/2006 | Root et al. |
| 7,058,510 B2 | 6/2006 | Kelly et al. |
| 7,084,775 B1 | 8/2006 | Smith |
| 7,089,115 B2 | 8/2006 | Chapman et al. |
| 7,089,116 B2 | 8/2006 | Smith |
| 7,092,740 B1 * | 8/2006 | Chi ............................ 455/566 |
| 7,139,664 B2 | 11/2006 | Kelly et al. |
| 7,181,345 B2 | 2/2007 | Rosenfeld et al. |
| 7,185,044 B2 | 2/2007 | Ryan et al. |
| 7,191,065 B2 | 3/2007 | Root et al. |
| 7,248,159 B2 | 7/2007 | Smith |
| 7,249,159 B1 | 7/2007 | Horvitz et al. |
| 7,275,089 B1 | 9/2007 | Marshall et al. |
| 7,289,908 B2 | 10/2007 | Root et al. |
| 7,315,782 B2 | 1/2008 | Root et al. |
| 7,383,130 B1 | 6/2008 | Koosam |
| 7,421,344 B1 | 9/2008 | Marsh et al. |
| 2001/0030624 A1 | 10/2001 | Schwoegler |
| 2002/0008637 A1 | 1/2002 | Lemelson et al. |
| 2003/0171870 A1 * | 9/2003 | Gueziec ........................ 701/202 |
| 2004/0010372 A1 | 1/2004 | Schwoegler |
| 2004/0043760 A1 | 3/2004 | Rosenfeld et al. |
| 2004/0080430 A1 | 4/2004 | Videtich |
| 2004/0243533 A1 | 12/2004 | Dempster et al. |
| 2005/0024236 A1 | 2/2005 | Gosdin et al. |
| 2005/0046594 A1 * | 3/2005 | Taylor ........................... 340/905 |
| 2005/0197775 A1 * | 9/2005 | Smith ................................ 702/3 |
| 2005/0240378 A1 | 10/2005 | Smith et al. |
| 2005/0259606 A1 | 11/2005 | Shutter et al. |
| 2006/0015254 A1 | 1/2006 | Smith |
| 2006/0178140 A1 | 8/2006 | Smith et al. |
| 2007/0015521 A1 * | 1/2007 | Casey ........................ 455/456.3 |
| 2007/0046457 A1 | 3/2007 | Suzuki et al. |
| 2007/0049260 A1 | 3/2007 | Yuhara et al. |
| 2007/0083328 A1 | 4/2007 | Suzuki |
| 2007/0094262 A1 | 4/2007 | Suzuki et al. |

* cited by examiner

| 7 (MSB) | 6 | 5 | 4 | 3 | 2 | 1 | 0 |
|---|---|---|---|---|---|---|---|
| Lightning | High Winds | Low Visibility | Road Conditions || Weather Conditions |||
| | | | 0 Normal<br>1 Slippery<br>2 Ice<br>3 Snow ||  0 Clear<br>1 Partly Cloudy<br>2 Cloudy<br>3 Rain<br>4 Storm<br>5 Freezing Rain<br>6 Snow<br>7 No data |||

Figure 9

| Field Size (bits) | Field Name | Description |
|---|---|---|
| 13 | SCOL | Mesh Column number x 16 (1/128 degree resolution) |
| 12 | SROW | Mesh Row number x 16 (1/128 degree resolution) |
| 8 | FDIR | Forecast direction in two degree steps, all one bits if no forecast |
| 6 | FSPD | Forecast movement speed, m/s, all one bits if no forecast |
| 1 | SHR | Shear flag |
| 2 | HSIZE | Hail size<br>  0 pea size        2 golf ball size<br>  1 dime size      3 very large |
| 2 | HPROB | Hail probability<br>  0 low or none   2 high<br>  1 moderate      3 highest |
| 2 | RATE | Rain rate<br>  0 ?? mm/hr     2 ?? mm/hr<br>  1 ?? mm/hr     3 ?? mm/hr |
| 3 | WID | Storm width<br>  0 3 km      4 12 km<br>  1 5 km      5 15 km<br>  2 7 km      6 20 km<br>  3 9 km      7 25 km |
| 2 | BWID | Storm back width<br>  0 0 km      2 4 km<br>  1 2 km      3 6 km |
| 2 | FAN | Storm fanout<br>  0 0 degrees    2 15 degrees<br>  1 7.5 degrees  3 22.5 degrees |

Figure 10

| Bit → <br> Byte ↓ | 7 | 6 | 5 | 4 | 3 | 2 | 1 | 0 |
|---|---|---|---|---|---|---|---|---|
| 0 | SCOL ||||||||
| 1 | WID |||| | | | |
| 2 | SROW ||||||||
| 3 | FAN ||| BWID ||| | |
| 4 | FDIR ||||||||
| 5 | RATE || FSPD |||||| 
| 6 | 0 | 0 | 0 | SHR | HPROB || HSIZE ||

Figure 12

| WID | Type |
|---|---|
| 0 | Tornado Watch |
| 1 | Severe Thunderstorm Watch |
| 2 | Hurricane Watch |
| 3 | Tropical Storm Watch |
| 4 | Flash Flood Watch |
| 5 | Coastal Flood Watch |
| 7 | Winter Storm Watch |
| 8 | Other Watch |
| 9 | Small Stream Flood Advisory |
| 10 | Snow Advisory |
| 11 | Freezing Rain Advisory |
| 12 | Winter Weather Advisory |
| 13 | High Wind Advisory |
| 14 | Tornado Warning |
| 15 | Severe Thunderstorm Warning |
| 16 | Hurricane Warning |
| 17 | Tropical Storm Warning |
| 18 | Flash Flood Warning |
| 19 | Coastal Flood Warning |
| 20 | Blizzard Warning |
| 21 | Winter Storm Warning |
| 22 | Ice Storm Warning |
| 23 | High Wind Warning |
| 24 | Other Warning |
| 25 | Roads Closed |

Figure 13

| Field Size (bits) | Field Name | Description |
|---|---|---|
| 11 | WCOL | Mesh Column number x 4 (1/32 degree resolution) |
| 10 | WROW | Mesh Row number x 4 (1/34 degree resolution) |
| 6 | WCCNT | Number of consecutive columns in warning (1/32 degree) |
| 6 | WRCNT | Number of consecutive rows in warning (1/32 degree) |
| 5 | WID | Warning ID, see previous table |
| 1 | CANC | Cancel flag |

Figure 14

| Bit →<br>Byte ↓ | 7 | 6 | 5 | 4 | 3 | 2 | 1 | 0 |
|---|---|---|---|---|---|---|---|---|
| 0 | WCOL.7:0 ||||||||
| 1 | WCCNT.3:0 |||| CANC | WCOL.10:8 |||
| 2 | WRCNT |||||| WCCNT.5:4 ||
| 3 | WROW.7:0 ||||||||
| 4 | 0 | WID ||||| WROW.9:8 ||

Figure 15

| Offset | # Bytes | Value | |
|---|---|---|---|
| Mesh Column Message | | | |
| 0 | 2 | E9 XX | SYNC, any E9 00 in body replaced with XX |
| 2 | 1 | 0x00 + COL.8 | Message ID (0000b) + bit 8 of COL (column number) |
| 3 | 1 | COL.7:0 | Bits 7-0 of COL |
| 4-varies | | varies | MRLE compressed message body |
| varies | 2 | E9 00 | Optional EOM |
| Storm Location Message | | | |
| 0 | 2 | E9 XX | SYNC, any E9 00 in body replaced with XX |
| 2 | 1 | 0x10 | Message ID |
| 3-9 | 7 | varies | First Storm Location Data item |
| 10-varies | 7*n | varies | Optional additional Storm Location Data items |
| varies | 2 | E9 00 | Optional EOM |
| Warning Message | | | |
| 0 | 2 | E9 XX | SYNC, any E9 00 in body replaced with XX |
| 2 | 1 | 0x20 | Message ID |
| 3-7 | 5 | varies | First Warning Data item |
| 8-varies | 5*n | varies | Optional additional Warning Data items |
| varies | 2 | E9 00 | Optional EOM |
| City Forecast Message | | | |
| 0 | 2 | E9 XX | SYNC, any E9 00 in body replaced with XX |
| 2 | 1 | 0x30 | Message ID |
| 3-?? | ?? | varies | First Forecast Data item |
| ??-varies | ??*n | varies | Optional additional Forecast Data items |
| varies | 2 | E9 00 | Optional EOM |

Figure 16

SYSTEM AND METHOD FOR PROVIDING ENVIRONMENTAL INFORMATION TO A WIRELESS TRANSMITTER COVERAGE AREA

CROSS-REFERENCE TO RELATED APPLICATIONS

This non-provisional application is a continuation-in-part of, and claims priority to, and the benefit of, U.S. Nonprovisional application Ser. No. 12/040,295, filed Feb. 29, 2008, which is a continuation-in-part application claiming priority to, and the benefit or U.S. Nonprovisional application Ser. No. 11/495,078, filed Jul. 28, 2006, which claims priority to U.S. Provisional App. Ser. No. 60/721,701, filed Sep. 29, 2005, all of which are incorporated by reference herein.

FIELD

The present invention relates generally to the distribution of site-specific and/or real-time information through a communications network, and particularly, to the distribution of real-time and site-specific weather related information and alerts, to remote units over a wireless communications network, such as a Wi-Fi network or cellular telephone network. The present invention also provides a method and system for the selective distribution of environmental information to a plurality of users based upon their location within the communication range of a wireless transmitter.

DESCRIPTION OF THE RELATED ART

The importance of weather reporting and forecasting in our daily lives cannot be contested. A large percentage of the people in the United States watch their local evening news on a nightly basis to see the local weather report and forecast. This information may then used to make decisions regarding what to wear, what to do, and, in travel, where and when it is safe to travel. Under certain circumstances, such as in the case of severe weather, some people may find themselves in situations where they are making life and death decisions based upon the weather information they have available to them.

This information is particularly important to travelers on the road, on the water or in the air. Severe weather may arise abruptly, giving the traveler very little warning and few options for safe travel. For cars and trucks, road conditions can change as a result of weather events such as rain or sleet.

Travelers may obtain weather data reported by television stations or networks prior to their journeys and plan accordingly. Local television stations, as well as the national networks, obtain weather data from the National Weather Service (NWS) which maintains a network of radar installations located at approximately one hundred thirty-eight sites throughout the United States. Observers at each of these installations monitor the weather conditions within their area and provide hourly teletyped messages to subscribers, typically through a third party weather service provider such as GTE Contel, a subsidiary of GTE Government Systems. In addition, other services provide lightning strike information on a subscription basis, such as through Global Atmospherics, Arizona, U.S.A.

The weather information provided by any one or a combination of the above services may be synthesized at a local television station into an understandable format for presentation to the public. In general, the meteorological data is gathered at the local television station and combined with image maps of a geographical region to generate a weather image, i.e., a graphical illustration of the weather. In addition, the local temperatures for various communities or cities within the viewing area of the station may also be generated on the weather image. A sequence of these composite weather images can be looped to create weather animation. The local television station may then broadcast the weather images to viewers.

Although the current weather reporting and forecasting systems used by television stations and networks have much benefit, they may not provide relevant weather information during severe weather, or when weather manifests differently than forecasts. In such circumstances the weather forecasts obtained prior to traveling are rendered useless. This is particularly true when it comes to the existence of severe weather which arises quickly without much warning, as is often the case with tornadoes. It is well known that tornadoes and other types of severe weather can strike quickly without much prior notice. The information provided by the television stations and networks regarding these types of severe weather are seldom provided in a real-time fashion and are generally not detailed as to the specific location or direction of the weather front. Therefore, travelers are often not given sufficient warning to adequately prepare for the weather in order to protect their property or find a safe refuge for themselves.

Travelers may obtain weather warnings from a radio broadcast from a car radio, if the radio is on and tuned to the proper station. Moreover, the weather information that is provided is often provided on a county wide basis which, depending on the size of the county, the actual path of the severe weather through a county, and the position of the listeners within the county, may be irrelevant.

An alternative source of weather information is through weather radios such as the Realistic Weather Radio Alert III, Model No. 12-140, distributed through "Radio Shack," a division of the Tandy Corporation. In general, weather radios may provide listeners with prerecorded or live weather updates on an essentially continuous basis. The weather radios receive the weather information updates which are broadcasts by the National Weather Service (NWS) from local transmitters using specific frequencies designated by the Federal Communication Commission (FCC). The weather updates usually comprise regular weather information which is prerecorded and then broadcast, except for the issuance of severe weather watches or warnings. In those cases, a prerecorded (or sometimes live) watch or warning message is preceded by a tone (e.g., a 1,000 cycle tone) that is manually activated at the broadcast station. The tone weather radios that are turned on and within the range of the broadcasted signal may receive the tone which activates an audible alarm on the radio. The audible alarm is typically not distinctive as to whether it represents a watch and warning, nor does the audible alarm indicate the type or severity of the severe weather. The alarm will usually continue until the user pushes an alert key or button on the weather radio. It is noted that NWS personnel are responsible for both manually recording of the audio messages for broadcast and the manually activating of the tone. However, most automobiles and wireless devices are not equipped with such devices.

Real-time, site-specific distribution of weather information has been described previously in co-owned U.S. Pat. Nos. 6,018,699, issued Jan. 25, 2000; 6,275,774, issued Aug. 21, 2001; 6,493,633, issued Dec. 10, 2002; and 6,490,525, issued Dec. 3, 2002. Those references teach a remote unit that receives information from the distribution network and provides an alert to the user. In some embodiments, the remote units are mobile units and provided with some programming to allow the remote unit to determine based upon input from a global positioning system (GPS) whether information is relevant to it. Weather data is received by a server system which encodes the data into a database in the form of a grid where grid cells are associated with geographic areas. This database is transmitted over a distribution network which could be over a cellular network, a land line network, a satellite network or any combination thereof, where eventually it is received by the remote units which decode the data. In some embodiments, remote units may include programming that allows the remote unit to interpret and display data. Such systems find use with emergency response personnel and similar organizations that may be able to afford such equipment. However, some prior art systems communicate weather conditions to a predefined, fixed location directly to a known user communication address, for example, a cell phone or pager number.

Such remote units might be costly and complex for use by the average consumer. Nevertheless, individuals still need the information while they are traveling. Moreover, because of the need to focus one's attention on the road and/or limited bandwidth available to send information to remote users, the information presented must be succinct and provide the user with only the information he or she needs. In other words, the system must alert users to conditions and not require the user to perform complex interpretation of data. To solve this problem, some remote units are designed to perform some, if not all, of the weather interpretation functions to display and alert the user in the most concise manner possible, either through visual or aural cues. This requires a complex device to enable the remote unit to perform this function.

Some prior art systems are known to generate weather hazard prediction information and distribute that information to remote units. However, many of these systems maintain an updated location of the remote unit in order to compare the remote unit's location to the weather conditions. Complex technology may be needed to allow systems to continuously track and update the location of a remote unit. Furthermore, when the remote unit is required to continuously update its current location, the remote unit will consume precious battery power that will shorten the life-span of the remote device before a recharge is needed. Thus, a simplified system and method is needed to be able to communicate environmental condition information to remote users that does not require a known location of a remote unit, but which will still provide site-specific and timely information to users.

There are vehicles, phones, and other remote devices being marketed today that are equipped with GPS-responsive navigation and location systems. Such systems provide geo-location information, and for some units, motion data. Thus, a system is needed to integrate multiple systems to provide real-time, site-specific alerts to wireless devices, while at the same time avoiding cost and complexity of more robust weather messaging systems. Such a system may be achieved in some devices by integrating a suitably enabled stand-alone device with existing navigation or geo-location information and other wireless communication systems, for example, Wi-Fi enabled devices or cellular phones.

SUMMARY

The present disclosure is directed to a system and method for the distribution of site-specific, real-time environmental information, primarily meteorological, or weather, data, over a wireless network to a plurality of remote systems.

The present invention also provides a system and method for providing timely, site-specific weather and other environmental condition information to remote users based on their proximity to wireless transmitters having a known location.

The present system and method, in some embodiments, does not require the location of the remote device to be known nor does it require a known user communication address. In one embodiment, the system and method divides up a geographic area into a plurality of cells, analyzes weather conditions affecting the cell, and or that may affect the cell in the future, and communicates appropriate weather alerts to a wireless distribution network. The distribution network distributes the weather alert to a fixed, wireless transmitter having a known location covering the geographic area in which the weather condition was located. The wireless transmitter, in turn, transmits the weather alert to all remote users within its range.

In another embodiment, the system and method identifies remote units within the coverage area of a wireless transmitter and transmits weather alerts directly to the remote units, for example using SMS, through the corresponding wireless transmitter.

In another embodiment, the system and method identifies the location and predicted path of meteorological phenomena defining a boundary area. A weather data message is distributed to the wireless transmitter having a coverage area that encompasses the location or predicted location of the meteorological phenomena. The message is received by remote units within the coverage area and processed to determine if the remote unit falls within the predicted path.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Meteorological, or weather, information to be distributed can include, but is not limited to, precipitation observation and forecast data (for example, snow, ice, and rain), winds, visibility, lightning, storms, cloud cover (for example, clear, partly cloudy, and overcast), warnings, advisories, current weather conditions, radar images, and forecast weather conditions. Those of skill in the art will recognize that the foregoing list is not exhaustive and that other types of meteorological, or weather, information can be used.

In addition to meteorological, or weather, information, the disclosed system and method can also distribute other "environmental" information, or data, and alerts regarding, for example, road conditions, road status, air quality, airport delays, etc.

For illustrative purposes, and not limitation, road condition information could include, for example, whether certain roads are clear, flooded, slippery, icing, or have snow accumulating. Road status information could include road closings and construction activities, as well as traffic information, for example, whether a road is clear, congested, very congested, or specific anticipated delays. Some of the foregoing road condition and road status information may be available from the federal and state departments of transportation, municipal and county public works, and the American Automobile Association (AAA). Air quality information could include, for example, a pollen count or other air quality index known in the art. Other notices could also be provided, for example, airport delay information. These data may also be received over an electronic communications network in a manner similar to that used to receive meteorological data further described below.

When transmitting or receiving information over a wireless network, the bandwidth constraints of the wireless network must be taken into account. This is particularly important when transmitting or receiving environmental information to or from a remote unit that is also designed to transmit or receive other wireless communications. For example, cellular phones are designed to send and receive cellular phone calls. Personal digital assistants (PDAs) or other wireless computing devices may similarly transmit and receive information. Thus, the environmental information to be communicated to these and other remote users must be formatted and distributed in a manner that does not substantially interfere with the other functions of the remote device.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

FIG. 9 is an alternative embodiment of the contents of an environmental data matrix;

FIG. 10 is an exemplary embodiment of a storm location data item;

FIG. 12 is an exemplary embodiment of a storm location message;

FIG. 13 is an exemplary embodiment of different warnings;

FIG. 14 is an exemplary embodiment of the structure of a warning data item;

FIG. 15 is an exemplary embodiment of a warning message;

FIG. 16 is an exemplary embodiment of transmitted messages;

FIG. 20 is an exemplary flow chart of a portion of the method and system disclosed in FIG. 17.

DETAILED DESCRIPTION

The various embodiments of the present invention and their advantages are best understood by referring to FIGS. 1 through 21 of the drawings. The elements of the drawings are not necessarily to scale, emphasis instead being placed upon clearly illustrating the principles of the invention. Throughout the drawings, like numerals are used for like and corresponding parts of the various drawings.

As used herein the term "device" is intended to mean a single piece of equipment, contained with a single housing. The term "system" is intended to mean a collection of components (which may be apparatuses, devices, or subsystems) that communicate or interoperate with one another to accomplish a function or set of functions. A system may be distributed or by contained within a "device."

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

With this in mind, this invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1:
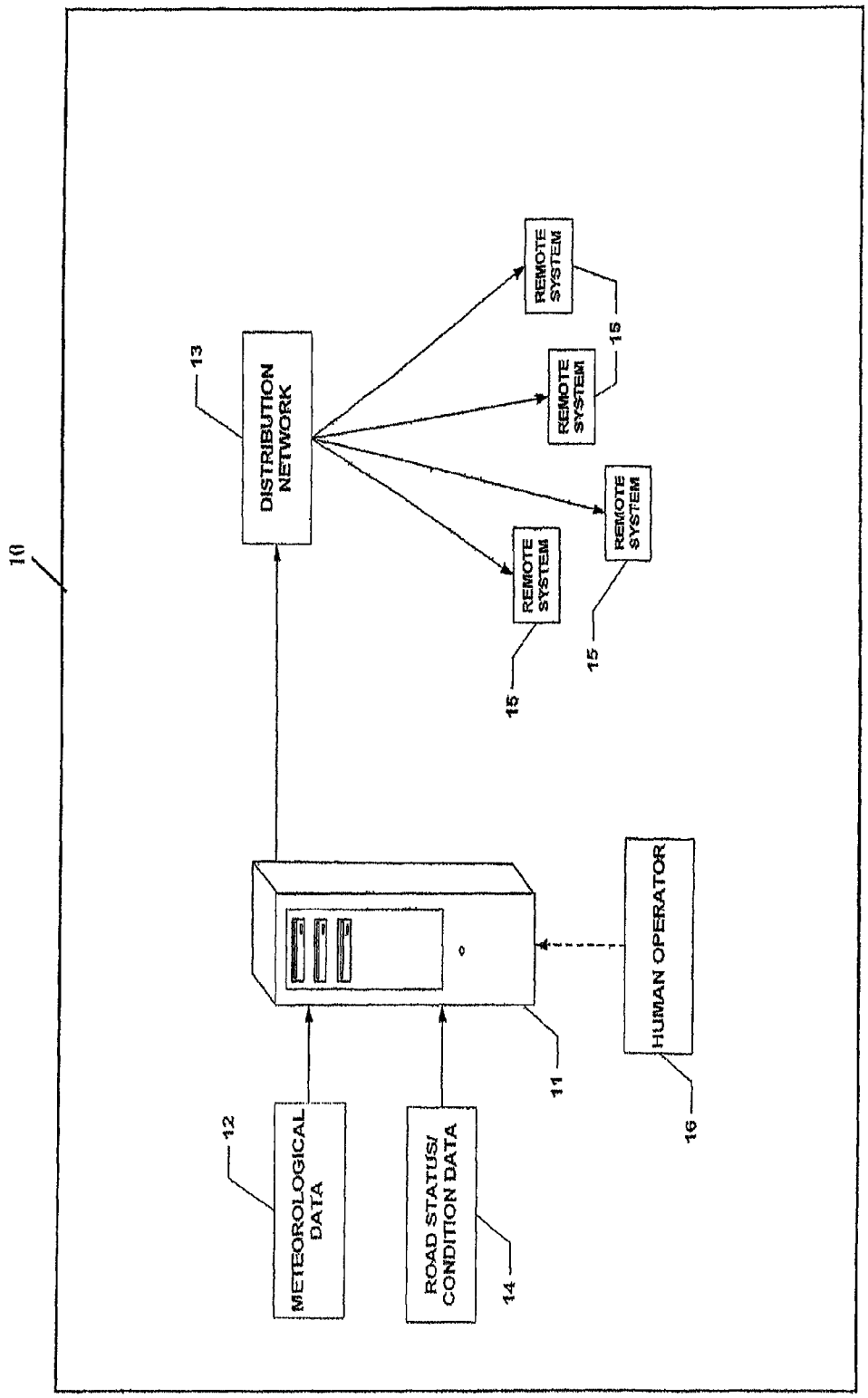
FIG. 1 is a functional diagram of the system architecture according to an embodiment of the present invention.

Referring now to FIG. 1, a system for providing real-time site specific weather information in accordance with one embodiment of the present invention is illustrated. The system 10 comprises a matrix encoder 11 in communication with distribution network 13. In turn distribution network 13 is in communication with one or more remote systems 15. Matrix encoder 11 receives meteorological data 12 from a variety of sources including weather information for a geographic area which is relevant to one or more of the remote systems 15. Optionally, matrix encoder 11 may also receive road status or road condition data 14 or other environmental condition information for a geographic area relevant to one or more remote systems 15. The various data 12, 14 are processed by matrix encoder 11 to construct a threat matrix which is a compilation of interpreted weather and road condition and status data and transmit the threat matrix to one or more remote systems 15 over distribution network 13. As discussed further below, in some alternative embodiments, all of the processed meteorological data may not be formatted into the threat matrix or grid structure, but may be compiled and distributed in other formats. Remote systems 15 process the received data to provide weather or road condition or other environmental condition information and alerts to users traveling in, or about to travel in, the geographic area affected, or that may be affected by such weather or road conditions or environmental condition information.

Figure 2:
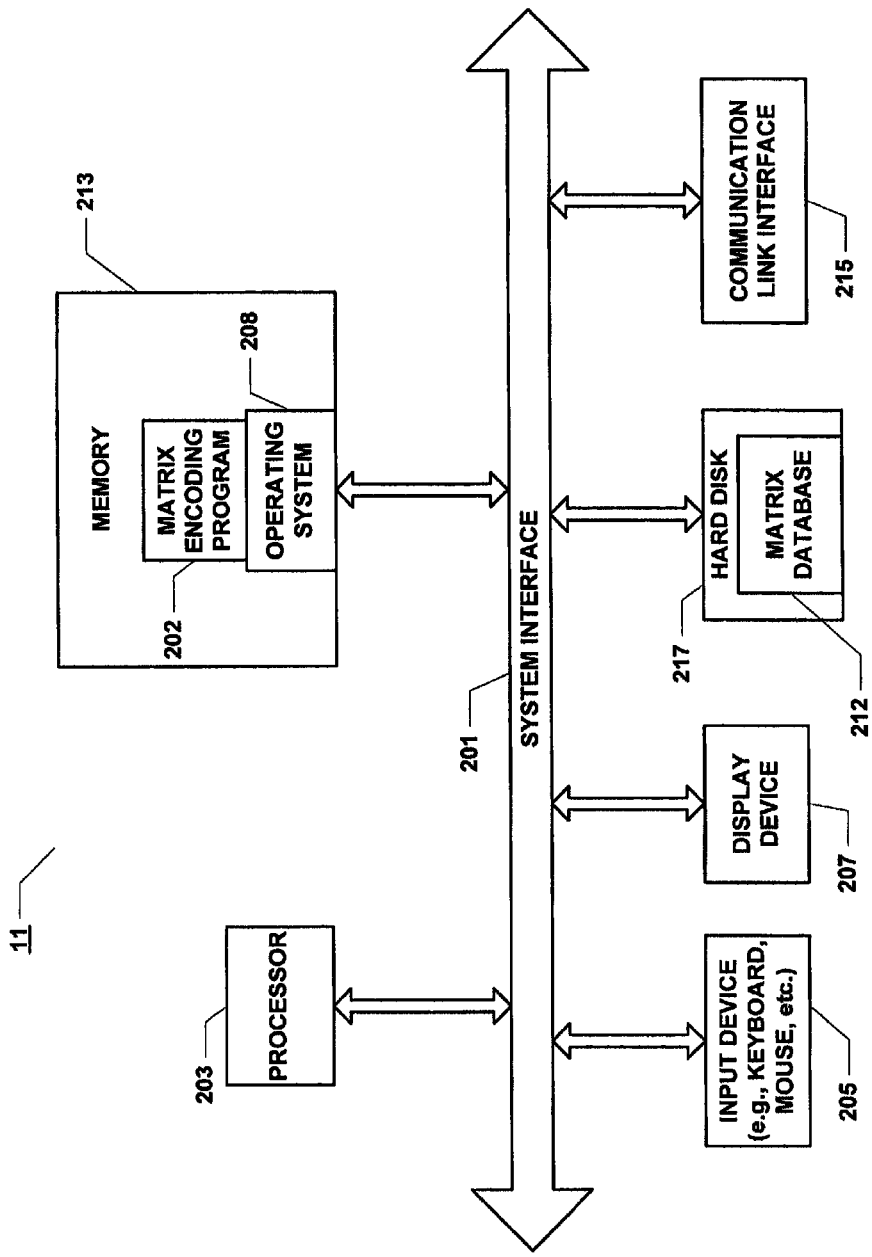
FIG. 2 is a functional diagram of a matrix encoder according to an embodiment of the present invention.

An illustration of an exemplary matrix encoder 11 is provided by the functional diagram of FIG. 2. Exemplary matrix encoder 11 includes encoding program 202 in accordance with the present invention. As shown, the matrix encoder 11 is preferably configured as a special purpose computer or other apparatus suitable for executing the program code embodied within the encoding program 202 so as to impart the functionality described herein and those other functionalities necessary for the operation of the present invention as would be apparent to one of ordinary skill in the art. The matrix encoder 11 further includes a processor 203 that can communicate with the other elements within the matrix encoder 11 via system interface 201. An input device 205, for example, a keyboard or mouse, is used to input data from a user, and a screen display device 207, for example, a monitor, is used to output data to the user. A memory 213 within the matrix encoder 11 contains the encoding program 202 for imparting the functions described herein. In addition, the memory 213 includes a conventional operating system 208 that communicates with the encoding program 202 and enables execution of the encoding program 202 by the processor 203. A communication link interface 215 is provided for interfacing the matrix encoder 11 with other related systems for purposes such as receiving meteorological data and road status data, or transmitting data to the distribution network 13. Lastly, a hard disk 217 may be provided as a nonvolatile memory for storing information such as a matrix database 212, and other data to be transmitted, as described in more detail below. It will be appreciated by those skilled in the art that matrix encoder 11 may be also achieved by using a cluster of two or more computers in communication, as may be necessary to handle the data.

Matrix encoder 11 is configured to receive meteorological data, road status/road condition data and/or environmental condition data via communication link interface 215, or alternatively, via manual input through input device 205. Meteorological data 12 include data on weather phenomena that are of interest to travelers. Non-limiting examples of such data are lightning strike locations, precipitation observation data, precipitation forecasts, hail, visibility, cloud cover, wind data, wind shear, storm warnings, flood warnings, and snow data. Those skilled in the relevant arts will appreciate that such data may be obtained from a variety of sources. Some non-limiting examples of meteorological data sources include, the National Oceanic & Atmospheric Administration (NOAA) via its NOAAport, National Weather Service (NWS), National Lightning Detection Network, local Doppler radars, NEXRAD radars, National Digital Forecast Database, Flash Flood Guidance Grid, local, ground based sensors, and the Rapid Update Cycle (RUC) model available from the National Centers for Environmental Prediction (NCEP). Meteorological data can also be obtained from private third party weather providers utilizing their own meteorological processing systems, for example, Baron Services, Inc. These data are available over an electronic communications network using suitable transfer protocols, e.g., file transfer protocol, or the like, and may be automatically retrieved by matrix encoder 11 which is configured with control logic to cause matrix encoder 11 to execute that function. Alternatively, other processors may be configured with control logic to retrieve the required data, collate the data into a format and transfer that data to matrix encoder 11. Matrix encoder 11 is preferably adaptable to accept and process data in whatever format may be available from any source of meteorological or road data, or other environmental condition data currently existing or hereafter developed.

Road status data 14 includes, without limitation, road closings and openings, whether a road is under construction, or repair. Road status data 14 may also include traffic information, for example, whether a road is clear, congested, very congested, or specific anticipated delays. Presentation of information from this data allows users to plan alternate routes. These data are available from the Federal and state departments of transportation, municipal and county public works, and the American Automobile Association (AAA). Other non-weather data may be obtained from other sources, for example, law enforcement agencies or the Federal Aviation Administration. Also an electronic communications network may be used to automatically retrieve road status data and other environmental data in a manner similar to that used to retrieve meteorological data.

Road condition data relates to whether there may be ice, water, or other substances on a road that present a hazard to safe driving. This data may be available from outside sources or generated by control logic in matrix encoder 11. For example, if an area experiences rain, matrix encoder 11 may be configured to indicate that the roads in that area are wet. Similarly, if meteorological data show that temperatures in an area are below freezing and that the area has had or will experience precipitation, matrix encoder 11 may be configured to also indicate that the roads are icy. In addition, road condition data may be provided by observation and automatically retrieved via communication link interface 215. Similarly, those skilled in the arts will appreciate that traffic alert data may also be obtained from a variety of sources.

It should be noted that an optional human operator 16 may also manually input both meteorological data and road status/condition data, as well as enter adjustments or correction to the received data in the case that retrieved data is inconsistent or in error. This may be achieved through input device 205.

The data are received by or input into the matrix encoder 11 and processed in accordance with control logic comprising matrix encoding program 202. Specifically, environmental data, including measurements, observations, and forecasts, along with locations, and forecast locations of events, may be retrieved and control logic within matrix encoding program 202 configured to render "presence" decisions based upon pre-defined criteria. For example, a matrix or grid cell affected by a certain meteorological event may be populated with the following information: heavy rain, high winds, lightning, and marginal visibility. In some alternative embodiments, discussed further below, subsets of the data may not be processed as "presence or "non-presence". For example, data may be generated related to current temperatures, observations, and long term forecasts, storm location data, and/or warnings and watch data.

If the grid covers a large geographic area, for example, the continental United States, only portions of the grid may be constructed at any one time. Alternatively, multiple matrix encoders may be used, for example, to construct grids for different geographic locations, or to construct separate grids for the same geographic locations, as further described below.

Matrix encoding program 202 is also configured to construct a grid comprising a plurality of cells each of which are associated with a segment of the land area throughout which the messages are to be distributed. Each cell is preferably referenced or identified by at least one latitude coordinate and one longitude coordinate within the cell. In one exemplary embodiment of the present invention, cell reference coordinates are the geographic points at which the centers of the cells are overlayed. In another embodiment, the reference coordinates are any of the corners of the cells. In a further embodiment, the reference coordinates may be the midpoints of the cell boundaries. It will, thus, be apparent to those skilled in the relevant art that the cells may be identified by any coordinate within the cell.

Figure 5A:
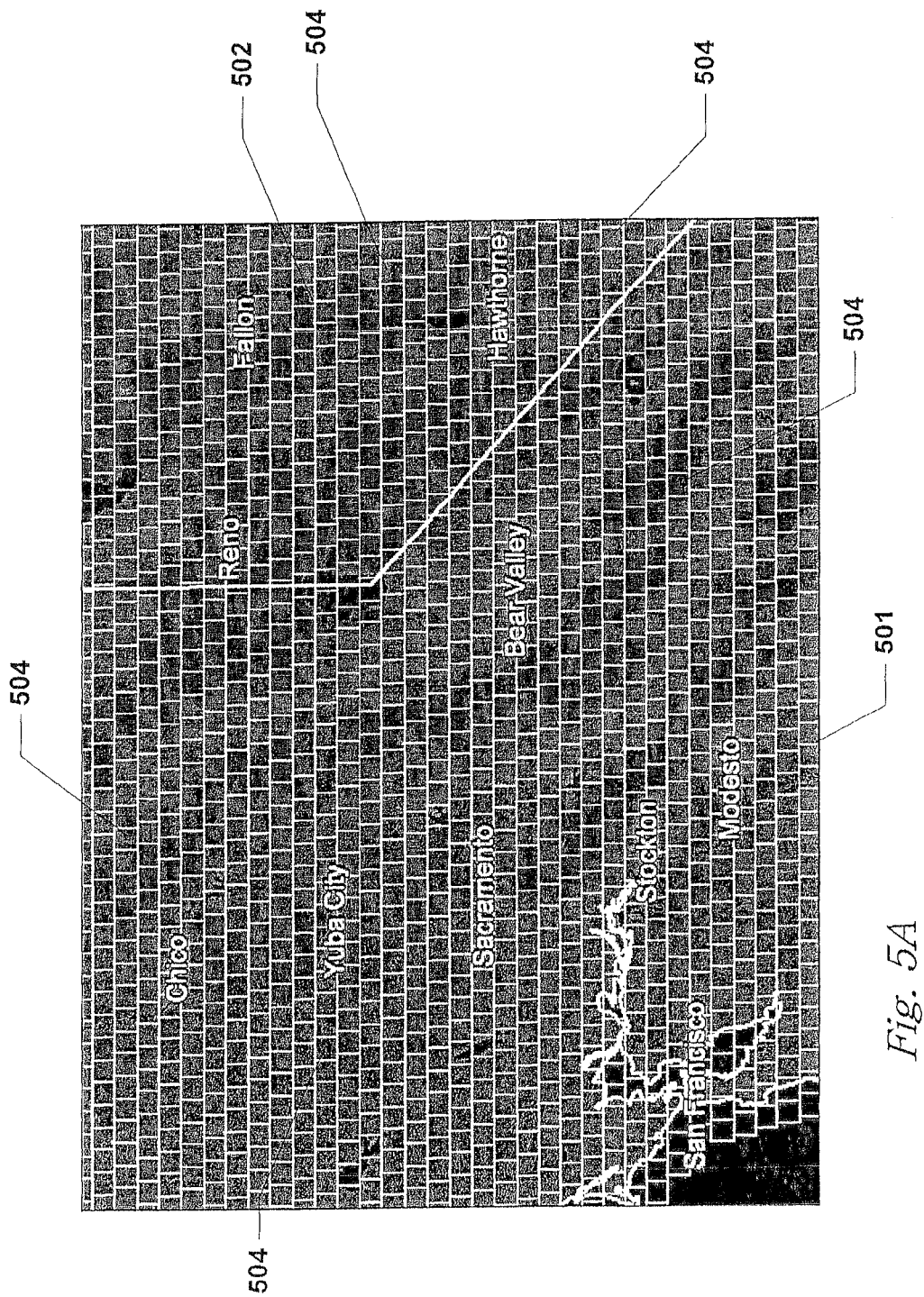
FIG. 5A is an illustrative screen capture of a computer graphic depicting an exemplary grid overlaying a geographic area.

The size of the cells can be defined by the user, depending upon the degree of information resolution desired. In one embodiment, for example, cells may be 10 km×10 km. An exemplary grid structure is shown in FIG. 5A wherein a Platte-cane projection of a geographic area 501 is overlayed with a grid 502 comprising a plurality of cells 504. Platte-cane projection lines of latitude and longitude are shown as straight and are evenly spaced. The cells 504 comprising the exemplary grid are ordered according to rows 507, which correspond to lines of latitude. Thus, all cells in a row have the same latitude from column to column. Those skilled in the art will also appreciate that the grid may be implemented by ordering cells along lines of longitude, or columns, as well.

If a grid structure is to cover the continental United States, the westernmost column of cells is approximately 125 degrees West, the easternmost column of cells is approximately 67 degrees West, the northernmost row of cells is approximately 50 degrees North, and the southernmost row of cells is approximately 25 degrees North.

For certain data, it is preferable to have smaller grid cells, and thus greater data resolution. One option is to have the resolution specified by the grid cells per degree of latitude and/or longitude. The system can generate grids, in cells per degree, of, for example, 1, 8, 16, and 32, although greater resolutions may also be used. For example, if the resolution is 16 cells per degree, each degree of latitude would have 16 cells and each degree of latitude would have 16 cells, for a total of 256 cells in a block 1 degree of latitude by 1 degree of longitude.

There may be multiple grids of various resolution. For example, one grid may be constructed and distributed for certain environmental data using a resolution of 8 cells per degree, while a second grid may be constructed and distributed for different environmental data, but for the same geographic region, using a resolution of 16 cells per degree. Alternatively, multiple grids could also have the same resolution, but different data. In another embodiment, a single grid can be constructed, but various data associated with the grid have different resolutions. In other words, the base grid could have a resolution of 8 cells per degree, but specific data associated with the grid are allocated to sub-cells of the primary grid. As discussed further below, in alternative embodiments, non-gridded information may also be distributed.

In either case (ordering cells by lines of longitude or latitude), it is preferable to keep cells 504 at a uniform size, so account must be taken of the longitude in constructing the grid since distance between lines of longitude decreases with increasing latitude values. For example, in one embodiment where the grid cells are ordered along lines of latitude, cell longitudes vary from row to row so that corresponding cells in differing rows are laterally offset with respect to each other (See FIG. 5A) presenting a "slanted column." In this case where the grid is ordered according to rows, columns of longitude may be converted from an x-coordinate with a multiplier specific to the row that may be calculated by a formula every time a cell is accessed, or the multiplier may be provided in a look-up table.

Figure 5B:
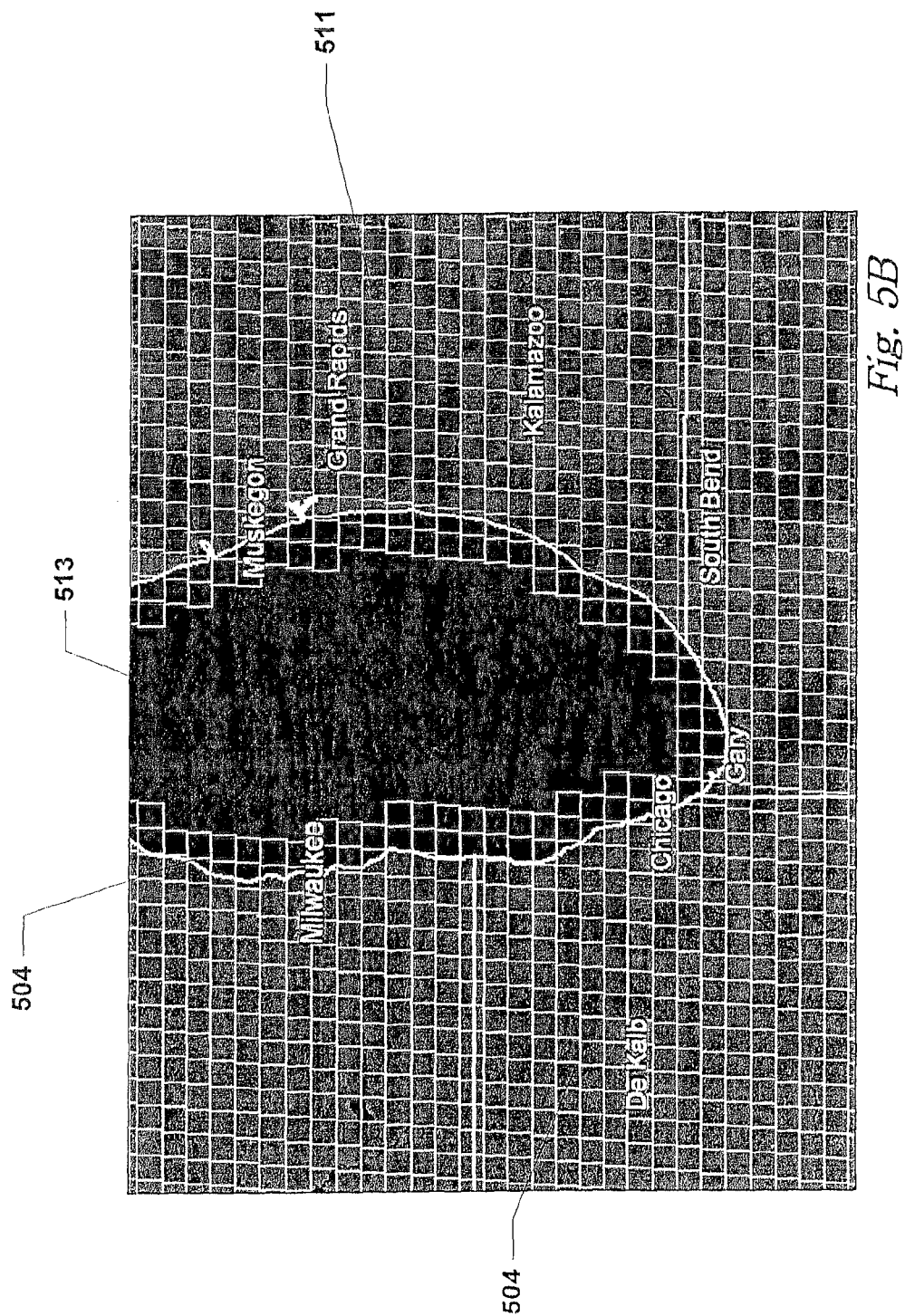
FIG. 5B is an illustrative screen capture of a computer graphic depicting an exemplary grid overlaying a geographic area wherein matrix cells are not defined for a body of water.

In another embodiment, it may be desired to decrease the size of the database. In applications that do not require or desire information to be transmitted to water-borne vessels, cells do not need to be defined for areas comprising bodies of water greater than 100 sq. miles. FIG. 5B illustrates a notional grid 511 overlaying an area that includes such a body of water 513.

With respect to the embodiment disclosed in Table 1, by comparing the coordinates defining the locations and predicted path of the meteorological phenomena to the grid on a cell by cell basis, each cell within the matrix that is affected by the phenomena can be identified. Furthermore, in this embodiment, matrix encoding program 210 may be configured with control logic to determine "presence" indicators for the identified cells that the phenomena affect at the current time, and that the phenomena will affect in some future time. Presence indicators are simply characters that indicate the presence of meteorological phenomena in a cell according to a pre-determined legend, an example of which is discussed in greater detail below. A presence indicator may also contain "characteristic" information indicating the intensity or severity, or duration of the event. In some embodiments, each cell is associated with one or more presence indicators. In other embodiments discussed below, additional non-"presence" data may be generated and associated with certain cells, for example, current temperatures, observations, and forecasts.

In the embodiment disclosed in Table 1, the grid cells combined with the meteorological phenomena presence information associated with identified cells comprise a meteorological data matrix. The meteorological data matrix information may be a database as would be appreciate by those skilled in the arts.

In one exemplary embodiment, meteorological phenomena are associated with grid cells in the following manner. Each cell includes 32 bits of data. These 32 bits are divided into fields representing the different meteorological phenomena that might exist. Each field may be 1, 2, or 3 bits long depending on how many values are desired to encode for a given field. Table 1 below shows a non-limiting example of a scheme for distributing bits among the fields. Bit 0 is the least significant bit, and bit 31 is the most significant bit.

TABLE 1

Exemplary matrix cell definition

| BITS | FIELD |
| --- | --- |
| 0-2 | Precipitation |
| 3 | Hail |
| 4-5 | Visibility |
| 6-7 | Storm path |
| 8-9 | Wind |
| 10-11 | NWS flood watch/warning |
| 12-13 | NWS thunderstorm watch/warning |
| 14-15 | NWS tornado watch/warning |
| 16 | Snow accumulation |
| 17-18 | Forecasted precipitation |
| 19 | Lightning |
| 20 | Icy roads |
| 21 | Road closings |
| 22-31 | Miscellaneous |

The precipitation field represents current precipitation. In this example, the field comprises three bits with at least six possible values to represent. Possible values include: 0 (No precipitation); 1 (Light rain); 2 (Heavy rain); 3 (Mixed precipitation (including ice)); 4 (Light snow); and 5 (Heavy snow).

The hail field is only one bit and if this bit is set, then the cell is under threat of severe hail. In this embodiment, this could represent hail that is currently detected in the cell, or it could indicate that a severe hail storm is approaching the cell. To determine which is the case, the value of the Storm path field must be examined as will be described below.

The next field indicates the visibility within the cell. In this embodiment possible values may be: 0 (Visibility un-obscured by weather); 1 (Fog); 2 (Heavy fog); and 3 (Very low visibility).

Storm path field is used to indicate whether a convective storm (as may be identified by a SCIT) is located within the cell boundaries, or, if not present in the cell, how soon the storm will arrive at the cell. Possible values may be as follows: 0 (No storm); 1 (Storm in 20 minutes); 2 (Storm in 10 minutes); 3 (Storm present).

The Wind field serves a dual role in this embodiment. If a convective storm with twisting wind is approaching a given cell, this field is set to 3 and the expected time of arrival is encoded in the Storm Path field. Otherwise, this field is used to indicate current wind strength in the cell. Possible values in this field may be as follows: 0 (Calm or moderate wind); 1 (High winds); 2 (Dangerous winds); 3 (Twisting storm approaching a convective storm with a significant amount of wind shear detected).

It should be noted, that in this example, the Storm path field is preferably examined in conjunction with the Hail field and the Wind field, because the latter two fields can indicate the type of storm that is approaching the cell. For example, if the Hail field is set to 1 and the Storm path field is set to 2, then a hail storm is expected to arrive in the cell in 10 minutes. If the Wind field is set to 3 (which is defined as "twisting wind") and the Storm Path field is set to 1, then a storm with dangerously twisting wind is expected to arrive in 20 minutes. It will be appreciated that because both types of storm use this one field to indicate their arrival time, some information could be lost in this embodiment. For example, if a hail storm is currently in the cell and a twisting storm will arrive in 20 minutes, the Storm Path field will contain the value 3 because of the hail storm, and the cell will not be associated with the twisting storm that is 20 minutes away, and that alert may not be provided by the remote system. In such cases, the remote system should be configured to "assume the worst", i.e., that both the hail storm and the twisting storm are nearby.

In this example, only the "twisting wind" value (numeric value of 3) in the Wind field represents a convective storm whose arrival time is indicated in the Storm Path field. If the Wind field contains a value other than 3, then that only reflects current wind conditions within the cell, and the Storm Path field will have a value of zero unless the Hail field is set. Also, it should be noted that a "twisting storm" is not necessarily a tornado. Whether a tornado is present, or may be present sometime in the future, is derived from NWS watch or warning data as described below.

The Flood watch/warning field is used to indicate that the cell is within (or includes some portion of) a county, or other geo-political division that is under a flood watch or warning. Possible values include: 0 (No watch or warning); 1 (flood watch); 2 (flood warning). Similarly, the Thunderstorm watch/warning field may be used to indicate that the cell is within (or includes some portion of) a county, or other geo-political division, that is under a thunderstorm watch or warning. Possible values include: 0 (No watch or warning); 1 (thunderstorm watch); and 2 (thunderstorm warning). And finally, the Tornado watch/warning field is used to indicate that the cell is within (or includes some portion of) a county, or other geo-political division, that is under a tornado watch or warning. Possible values may be: 0 (No watch or warning); 1 (tornado watch); and 2 (tornado warning).

The Snow accumulation field indicates that there is an accumulation of snow on the ground within the cell. This does not necessarily imply that it is currently snowing in the cell. This field can have two possible values, 1 for some amount of snow accumulation and 0 for no snow accumulation.

The forecasted precipitation field is used to indicate expected precipitation between current moment and some fixed amount of time in the future. Possible values may be as follows: 0 (No precipitation anticipated); 1 (Rain forecast); 2 (Mixed precipitation forecast); and 3 (Snow forecast).

The next three fields in this embodiment may be each one bit in size which simply indicates presence or no presence. The Lightning field is set to 1 if a lightning strike has been detected within the cell in the last 10 minutes, and 0 otherwise. The Icy roads field is set to 1 if an icy road hazard exists within the cell, and 0 otherwise. Last, the Road closings field is set to 1 if some roads within the cell are closed due, 0 otherwise. The remaining bits may be used for, as the field suggests for any other information, or additional weather phenomena categories. In this embodiment, each cell contains matrix values corresponding to the conditions in that cell. The matrix format is identical for all cells. The matrix data may be sent in multiple weather data messages. The information may be distributed by the distribution network 13 to the remote systems via weather data messages, discussed further below.

It will be understood that the field definitions described above are non-limiting. The fields could represent any aspect of meteorological data, road condition data, road status data or traffic data. For example, fields could be designed to indicate current or forecasted wind shear events, temperature extremes, slippery road conditions, or any other similar events or conditions.

It will be appreciated by those skilled in the relevant arts with the benefit of reading this disclosure that the above described system and method obtains meteorological data, analyzes it, and determines whether a given category of meteorological phenomena affects or will affect a specified geographic area. For this data, the resulting output may simply be a yes or no message, and perhaps an indication of the severity or duration with which phenomena affect an area. For example, lightning, high winds, hail storm, and shear storm, may be represented in this manner. Thus, the matrix encoder interprets the significance of weather phenomena for a geographic area, which results in a reduced processing and memory requirement for the receiving remote systems. This also advantageously reduces bandwidth required for the transmission of the information over the distribution network 13.

Once the matrix is encoded, in this embodiment, it is then conveyed in a data stream to the remote systems via the distribution network. Matrix encoder 11 constructs matrix messages, or weather data messages, associated with the meteorological data matrix that are communicated to distribution network 13. The matrix data may be transmitted to distribution network 13 in a variety of formats. However, it is preferable to reduce processing and software requirements, and thus cost and complexity, of the remote systems. Therefore, it is preferable to further reduce the data that the remote systems are required to receive and process.

Figure 3:
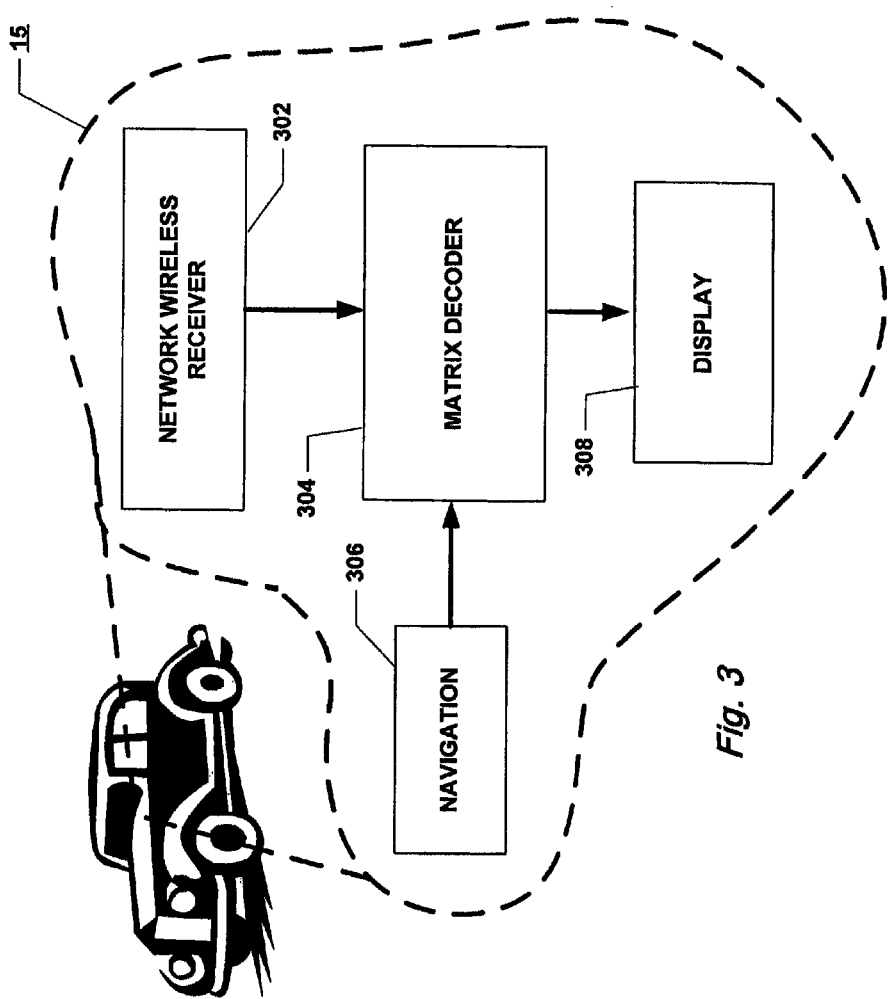
FIG. 3 is a functional diagram of a remote system according to an embodiment of the present invention.

With reference to FIG. 3, an exemplary remote system 15 includes wireless network receiver 302 and optionally a geo-positioning or navigation device 306 both communicating with matrix decoder 304 which in turn controls display device 308. Wireless network receiver 302 can be implemented with a radio receiver that is configured to receive and decode signals transmitted via a wireless network. In one embodiment the wireless network is a satellite radio network, for example, networks conducted by XM Satellite Radio, Inc. or Sirius Satellite Radio, Inc. In such case, wireless network receiver 302 is configured to receive, decode and demodulate signals that are transmitted over such networks according to that networks communication protocols, as would be understood by those skilled in the arts. Wireless network receiver 302 receives and decodes the network signals carrying matrix data messages and relays the messages to matrix decoder device 304.

It should be noted that distribution network 13 also can be implemented by a variety of different communication mediums such as, but not limited to, wireless (including cellular, WiFi, super Wi-Fi, WiMax, 802.15, Bluetooth®, and the like), cable television, pager, land-line telephone, cellular telephone, etc. It would be apparent to skilled artisans that in those embodiments where distribution network is not a wireless network, wireless network receiver would be an appropriate land-line counterpart (e.g., modem), or eliminated, depending upon the network communications protocols.

Navigation device 306 is a device that calculates its geographic position and optionally can also provide the speed and direction of travel of the remote system 15. Navigation device may be implemented 306 with a Global Positioning System (GPS) device or other suitable device, e.g., an inertial navigation computing system. Navigation device 306 provides geographic position of the remote system 15 to matrix decoder 304.

Figure 4:
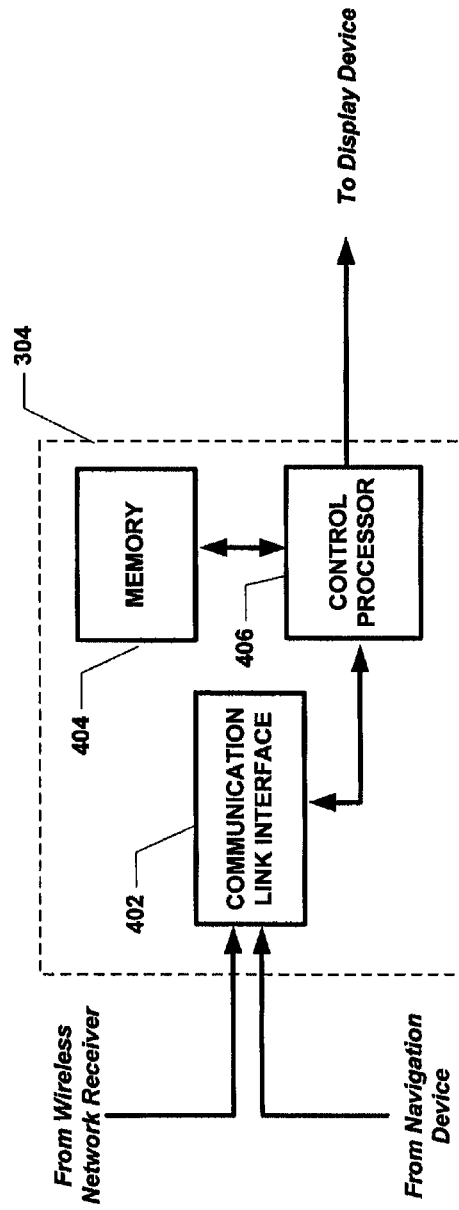
FIG. 4 is a functional diagram of a matrix decoder according to an embodiment of the present invention.

An illustration of an exemplary system for implementing matrix decoder 304 is provided at FIG. 4 where matrix decoder comprises a communication interface 402, a control processor 406, and a memory 404. The communication link interface 402 provides an interface from wireless network receiver 302 and navigation device 306 to matrix decoder 304. For the embodiment disclosed in Table 1, matrix messages are provided to the control processor 406 which includes the control logic for operation of the matrix decoder 304. Briefly stated, the control processor 406 processes the matrix messages by parsing the message data structure and making logical determinations as to the types of alert indications to be provided to the subscriber via display 308. Control processor 406 preferably includes control logic for discriminating between matrix messages to ensure that the remote system 15 only responds to messages containing alert information relevant to the remote system 15. As described in greater detail below, this may include comparing the cell identification within the matrix message with position information received from navigation device 306 or comparing the type of threat identified in the message and time of day to determine whether it is a type of threat the user has requested to be notified of, at the present time of day or night.

As discussed below with respect to alternative embodiments, weather data messages may not all be in the form of a meteorological data matrix. For these embodiments, the matrix decoder 304, control processors 406, communication interface 402, memory 404, and other aspects of the remote systems 15 are configured to receive and process this data in a manner similar to that with meteorological data matrix messages.

Display device 308 provides means by which to convey the site specific weather information in the storm profile to the end user. Display device 308 may include a speaker device for providing audio indication of weather information in the form of distinctive sounds or prerecorded audio messages. In addition, display device 308 may include visual means such as a display panel for providing weather information in the form of textual information, icons, or color-coded lights. Roads that are closed or have a dangerous conditions associated with them, for example, snow, can be highlighted or color coded. Such display panel may be implemented to display electronic graphic images with an Liquid Crystal Display (LCD) screen, Light Emitting Diode (LED), cathode ray tube (CRT) or the like.

Remote system 15 may be a unitary device, or, in the alternative, may be implemented in a non-unitary arrangement of separate components. For example, a vehicle equipped with a satellite radio receiver and a GPS device may be later equipped with a matrix decoder and associated display device. In such case, matrix decoder 304 could be achieved using a handheld computer, which includes a display, or the like. In another version, matrix decoder 304 could be a suitably configured wireless telephone or other handheld computing device. Display device may be included with the wireless telephone, or may be a separate component with which the wireless telephone communicates. It would be understood by those skilled in the relevant arts that if remote system 15 is a unitary structure, some elements, for example, communication link interface 402 could be eliminated as wireless receiver, navigation device and matrix decoder may be controlled by a common control processor, or processors.

As discussed above, the gridded matrix data is communicated to remote systems in the form of matrix messages or weather data messages. A message containing gridded data may include data for the entire matrix; however, a single message is preferably transmitted encoding only portions of the matrix data, for example, the values for a single row of cells. In one exemplary embodiment, messages are transmitted in a 32 bit format for each row of cells. This is done to minimize the effects of lost or corrupted data. For example, if the system transmits the whole matrix as a single message, and the remote system receives all but one byte, the remote system has no way of knowing what that byte was, or even which byte was lost. All it knows is that it did not receive all of the transmitted data. Therefore, the whole matrix message must be disregarded. Transmitting matrix values in separate messages, a loss of one byte results only in that message being lost, not the entire matrix. Messages are also preferably repeated periodically, even when the matrix cell values remain the same, for a number of times to increase the likelihood that remote systems receive all the data relevant to the geographic area in which the remote system is traveling to further minimize the effect of missing data.

A secondary benefit of transmitting matrix values as separate row (or column) messages, is that the remote systems may only need enough memory and processing capability to decode a single row, reducing hardware and software costs. Preferably, remote system 15 memory is also enough to cache a number of nearby cell values as well for cells to which the vehicle might reasonably travel within an update cycle, or the period with which updated matrix messages are transmitted. Obviously, in those embodiments where the matrix is ordered according to a column, the messages may represent individual columns of cells.

In addition to sending matrix messages for individual rows, matrix messages may be sent according to a predefined category of messages. For example, one category of matrix messages could be storm messages which would include information about storms, such as warnings and locations. Categories could also be based upon types of meteorological phenomena.

The remote system 15 matrix decoder 304 is asynchronous with the transmission of the matrix message. Therefore, matrix decoder may only receive a partial message. There also may be corrupted data, or interference. Preferably, the system includes communication protocols that allows matrix decoder to identify the beginning of matrix messages.

In one version, the protocol may include the use of a special reserve character to indicate the beginning of a message. When this character is read, the matrix decoder is configured to perform certain functions depending upon the next byte received after the special character. A problem may occur when the reserve character occurs elsewhere in the matrix message. A typical solution would be to cause the decoder to "escape" the character, but this adds to the size of the message for each instance in which a character is escaped. To avoid the incurrence of wasted bandwidth because of the increased size of the message, when the special reserve character happens to occur elsewhere in the message, it is replaced by replacement character. The replacement character is ideally a character that does not occur in the outgoing message and is dynamically determined for each row matrix message. It is identified in the message in the second message byte. So if the special reserve character occurs elsewhere in the message, matrix decoder replaces that character with the replacement character.

Figures 6, 7:
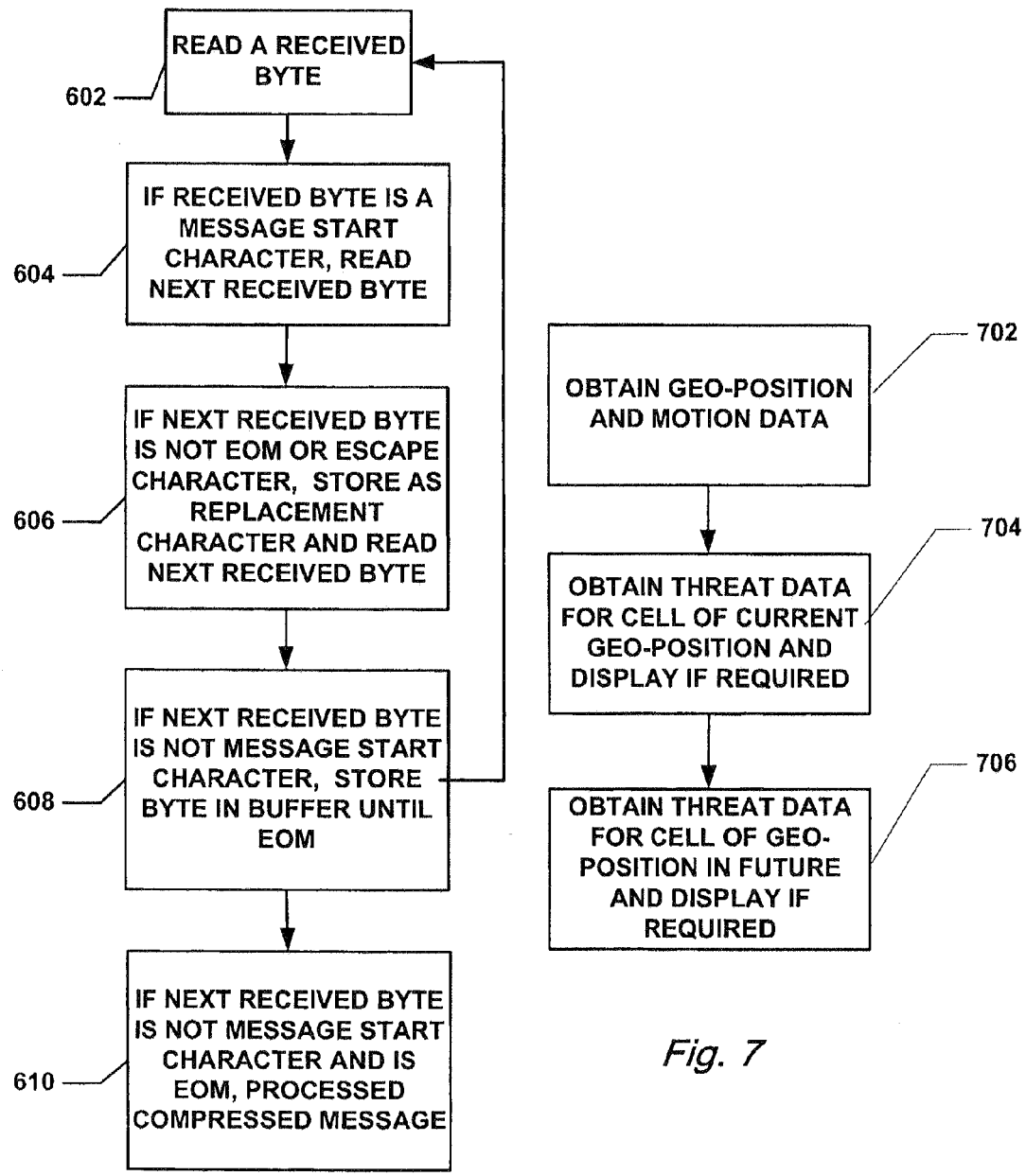
FIG. 6 is a flowchart illustrating an exemplary method used by the remote system decoder to initiate decoding of a matrix message.
FIG. 7 is a flowchart illustrating an exemplary method used by the remote system decoder to decode a matrix message.

FIG. 6 is a flowchart of one process that matrix decoder 304 may use to initiate decoding of the message. Matrix decoder receives and reads a byte 602. Matrix decoder control logic determines if the byte is a message start character, and if so, the next message byte is read 604. It should be understood that if the byte is not a message start character, the step 604 is performed again until a message start character is read. Next, matrix decoder control logic determines whether the next byte is an end of message (EOM) or an escape character 606, if so the next byte is stored as the replacement character to be used if the reserve character occurs in the message. The next byte is read and as long as it is not a message start, or EOM, the byte is stored in a buffer for later processing 608. When a byte is determined to be the EOM, the message is processed 610.

Because of the size of the row, some form of compression may be desired. For example, a run length compression technique, as would be appreciated by those skilled in the art. Once the process described with reference to FIG. 6 is performed and EOM is received, the message stored in the buffer are extracted and decompressed for processing. Additionally, to process messages only relevant to the cells in which the remote system is, or near. The first byte of the matrix message, therefore, could be the row, or latitude coordinate corresponding to the row. If the byte indicating the row indicates a row near the remote system current geo-position latitude, then the remainder of the message is processed. Subsequently, the columns relevant to the location of the remote system are read. The data from the relevant cells are stored.

FIG. 7 illustrates a method the matrix decoder may use to perform threat monitoring and alert functions. Matrix decoder obtains geo-position and motion data, including speed and heading, from the navigation device 702. It should be noted that the remote system 15 could be configured such that system speed is obtained from the vehicle speed sensing system in an alternative embodiment. Next, the threat data for the cell corresponding to the current position of the remote system, and an appropriate alert is displayed, if required 704. Displayed alerts include both aural and visual alerts. Then, if a cell or cells may affect the remote system at some time in the future, an appropriate alert is displayed 706. Future time may be any amount of time in the future, encompassing the cells in which the remote system may be at that time in the future, based upon its motion (heading and speed). Because vehicles tend to change heading, the predicted future time, and thus distance, may be an area in which the vehicle may be at that future time.

Figure 8:
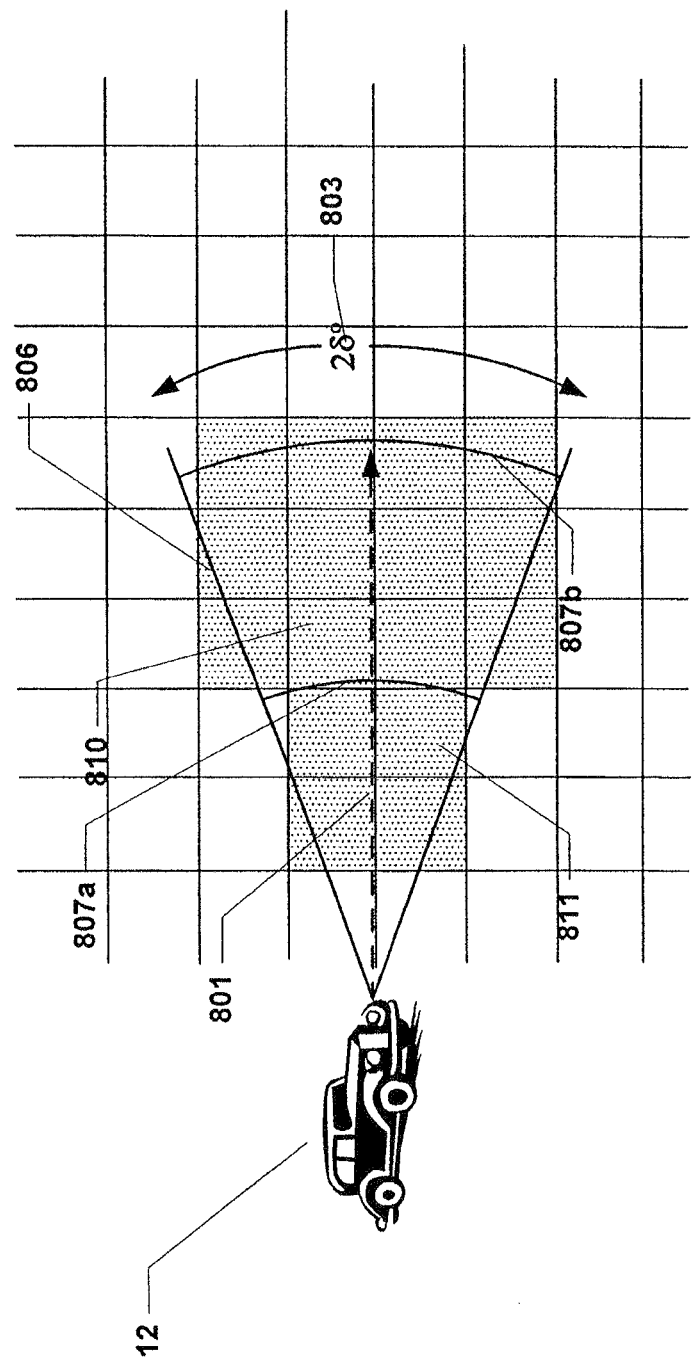
FIG. 8 is a diagram illustrating an exemplary method used by the remote system decoder in providing forecast, site-specific environmental condition information.

For example, and with reference to FIG. 8, as remote system 15 travels, its speed and heading are obtained by the matrix decoder 304. The remote system computer is configured with software to calculate a directional margin of some d and apply it to either side of the heading 801 is computed, resulting in an overall angular margin of 2d 803. One or more future time (or distance) lines 807*a, b*, are computed based upon the remote system's speed. For example, the nearest line 807*a* may be the predicted distance the remote system will travel in 5 minutes, and the distal line may be the distance the remote system will travel in ten minutes. Any time differential may be used, and any number of future time lines may be computed. The result is a "fan-like" area 806 that encompasses some geographic area. The fan-like area 806 is overlaid upon the matrix cells 810, 811 and the remote system determines which matrix cells the "fan" 806 intersects, shown as shaded. These cells are then presumed to be relevant to the remote user. The data associated with each of those cells are processed and, if necessary, according to the estimated time in the future that the remote system might enter a particular cell.

It should be noted that the systems and methods described above may incorporate a remote system that is non-mobile as well. For example, the remote system disclosed in co-owned U.S. Pat. No. 6,493,633, which is incorporated by reference herein, discloses a system for real-time distribution of site-specific weather information, and in particular, a receiving device for receiving the weather information that is intended for installation in a building or other fixed structure. The receiving device is preprogrammed with a location identifier for its position. In this way, it will be able to determine the relevancy of indicator data received by it from the distribution network according to the principles disclosed above.

In another embodiment, weather data messages can be comprised of separate messages, each associated with different environmental condition data. For example, weather data messages to be transmitted to remote systems 15 can include all or a subset of the following: (1) environmental data matrix consisting of weather conditions, road conditions, and specific hazards (similar to the matrix depicted in Table 1); (2) storm location data; (3) warnings data; and (4) city forecasts. This alternative embodiment is described further below.

In this embodiment, meteorological data is collected and processed by the matrix encoder 11 and preferably referenced to a grid covering the United States. In this embodiment, a portion of the data is delivered to the remote systems 15 in "columns" that are equally spaced in longitude across the US or "rows" equally spaced in latitude, while other portions are point specific. However, georeferencing of the point data is preferably related to the grid that is defined by the column and row spacing of the grid data.

In this embodiment, the continental United States is divided into a grid of cells, for example, spanning ⅛ (0.125) degree in both directions, and is referenced by its center location. Thus, a cell with the coordinates of 96W, 36N would cover the region from 96.0625 W to 95.9375 W and from 36.0625 N to 35.9374 N. The cell size in ground measurements is approximately 13.92 km in the north-south direction. In the west-east direction, the size gets larger as the latitude decreases. A cell at 49 N will measure about 9.13 km in the west-east direction, while at 25 N it will be about 12.61 km. More generally, cell width=13.92×cos(latitude).

A particular grid cell in this embodiment is located by its column and row number. If COL and ROW are column and row numbers, then, Longitude=COL0+COL/8.0, and Latitude=ROW0−ROW/8.0, where, COL0 is defined to be −125, and ROW0 is defined to be 50.

Column numbers may be transmitted in 9 bits, so longitude in this configuration can vary from −125 to −61.125 degrees. Row numbers may be transmitted in 8 bits, so latitude in this configuration can vary from 50 to 18.125 degrees.

Environmental Data Matrix

In this embodiment, using methodology similar that disclosed with regard to the data in Table 1, the grid cells are populated with certain environmental data associated with that cell to form an environmental data matrix. The environmental data matrix may consist of weather conditions (for example, clear, partly cloudy, cloudy, rain, storm, freezing rain, snow, or other), road conditions (for example, normal, slippery, ice, or snow), and specific hazards (for example, lightning, high winds, and low visibility). Lightning may be indicated, for example, if cloud to ground lightning was detected within some range of the cell (for example, 2 km) within some period of time (for example, the last 5-10 minutes). High winds may be indicated, for example, if high gusty or straight line winds have been detected in a storm within the cell, or sustained high winds that may affect driving are forecast for the area that includes the cell. Low visibility may be indicated, for example, if fog, either detected or forecast, blinding rain, or unusual smog, haze or volcanic ash exists within the cell.

In one embodiment, depicted in FIG. 9, a grid cell contains eight bits of information related to the conditions associated with it: 3 bits for weather conditions, 2 bits for road conditions, and 3 bits for specific hazards. Other conditions can be substituted, and more information (and thus more bits) can be utilized. However, the use of 8 bits per grid cell minimizes the transmission and processing requirements.

The environmental data matrix is preferably transmitted in column major order, although other transmission methods are acceptable. A separate message is preferably used for each column. Preferably, a message header, for example a column number, is sent at the start of each column, for example, by row. In this embodiment, for a grid covering the entire United States, the first cell in the data is for 50N, the second for 49.875N, and so on. The message may stop at the point where no more cells cross land. This is not required to be explicitly coded at this layer in the protocol, it is implied by detecting an end of message. For example, the grid column that goes through Maine at 68.5W covers the Atlantic Ocean at about 44.25N. Any areas that do not need to be transmitted may be transmitted as zeros.

Storm Location Data

In addition to an environmental data matrix, weather data messages in this embodiment may also include storm location data. Storm location data may be derived from those methods and systems known in the art, for example, as disclosed in U.S. Pat. No. 6,125,328 and U.S. Pat. No. 6,670,908, incorporated herein by reference. This data is preferably transmitted as "point" information, but locations of storms are preferably relative to the grid described above. For example, given a known longitude and latitude for a storm, its location in a particular grid cell, or a subset of a cell, can be determined. If a low resolution grid is used for the meteorological data matrix, as outlined above, greater resolution may be desired for the storm location data. Thus, the lower resolution grid is supplemented with information that locates the storm location data within any number of sub-blocks in a grid cell. For example, a particular grid cell can be further divided into 16 sub-blocks, and the storm data associated with a particular sub-block. This allows the storm location "point" data to be georeferenced to the environmental data matrix grid. An exemplary table showing fields that may be included in the storm location data is shown in FIG. 10. Note that in FIG. 10 (and in FIG. 14 discussed below), "mesh" is interchangeable with "grid" or "matrix". Alternatively, the storm location data can be generated for its own independent grid rather than georeferenced to the environmental data matrix grid.

In the embodiment shown in FIG. 10, the column number SCOL and row number SROW locates the cell relative to the environmental data matrix grid. The position of the storm is further refined by the sub-block number SUB. The latitude and longitude of the storm for this embodiment can be computed, Latitude=ROW0−SROW/128.0 and Longitude=COL0+SCOL/128.0.

The area impacted by a storm can be calculated using methods known in the art. For this embodiment, the area impacted by a storm can be computed from the forecast direction in two degree steps ("FDIR"), forecast movement speed in m/s ("FSPD"), the storm width ("WID"), the storm back width ("BWID"), and storm fan out ("FAN"). The values that may be used to create a trapezoidal shape of the area projected to be impacted by the storm are depicted in FIG. 11.

Figure 11:
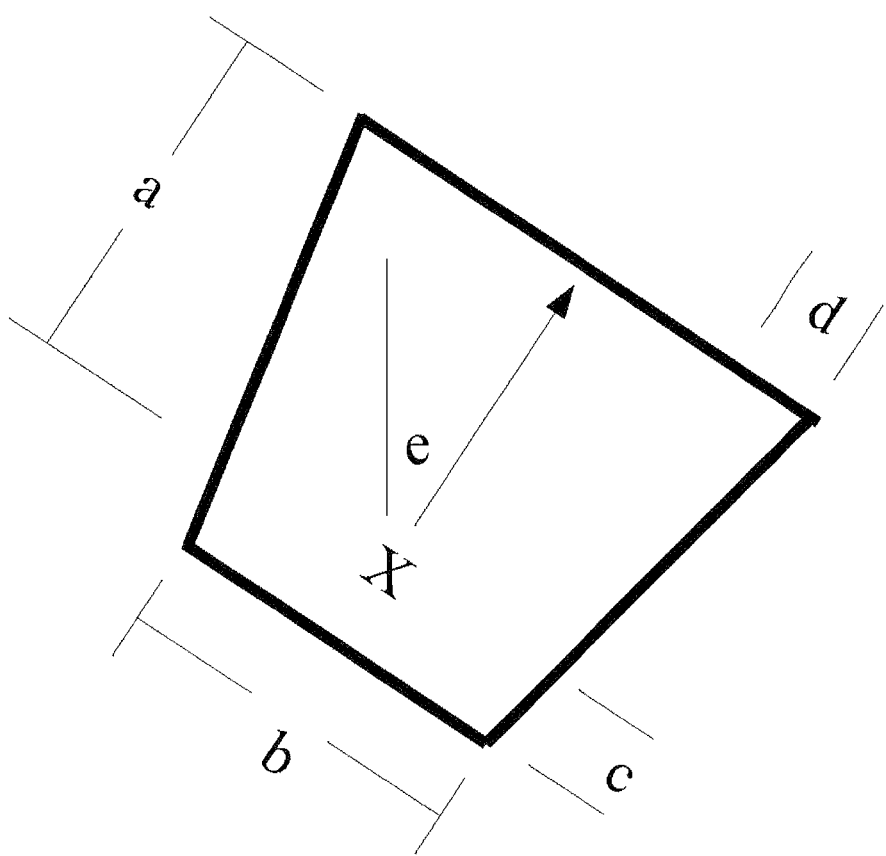
FIG. 11 is an exemplary embodiment of an area affected by a storm or other environmental condition.

In FIG. 11, X represents the storm location superimposed on the grid or map, dimension a is computed from FSPD (recommended time is 15 minutes), dimension b is WID, dimension c is BWID, angle d (fanout) is FAN, and angle e is FDIR, which is measured clockwise from north. In this embodiment, all grid cells overlaid by the trapezoid are considered affected by the storm. An optional enhancement is to replace the wider of the two parallel lines with an arc, with center X, that intersects the ends of the non-parallel lines. If FDIR is all one bits (which can happen when a storm is first detected), then a circle of radius WID with center at X may be used to define the impacted area.

A storm location message can contain multiple storm location data items (for example, 1 to 100). The number of items per message is determined by the transmitting server. A smaller number per message improves latency of other high priority warnings, while a larger number per message reduces loss of bandwidth due to message encapsulation overhead. An exemplary format of one storm location data item within a message is shown in FIG. 12.

In an alternative embodiment, the storm location data could be processed by the matrix encoder 11, populated into a grid similar to that of the environmental data matrix discussed above, and transmitted in gridded format. For example, the matrix encoder 11 could determine which cells are associated with the storm, and the storm characteristics (for example, hail, rain rate, shear flags, etc.), and transmit this data in gridded format. For example, cell 1 could be associated with pea sized hail, and have a shear flag, cell 2 could be associated with dime sized hail, but not shear flag, etc. This embodiment requires less processing by the matrix decoder.

Warnings Data

In addition to an environmental data matrix and storm location data, weather data messages in this embodiment may also include warnings data items. In one embodiment, four types of "warnings" are processed: advisories, watches, warnings and road closings. These warnings are cross-referenced with non-gridded data consisting of an enumeration of the various "warnings." In general, the first three types may be derived from bulletins from the National Weather Service (NWS). An exemplary listing of warnings is depicted in FIG. 13. The data in FIG. 13 may be transmitted to the remote units as part of a message, in its own message, or may be preprogrammed into the memory of the remote unit.

A warning data item is used to convey the warning type and location. Several warning data items may be needed to describe one warning, since the geographic shape of the warning may be irregular. Each data item may define a rectangular block up to 2×2 degrees. An exemplary structure of the warning data item is shown in FIG. 14.

In FIG. 14, the WCOL and WROW fields locate the northwest corner of a region of the warned area. The geographic location of the northwest corner is determined by Latitude=ROW0−WROW/32.0+1/64.0, and Longitude=COL0+WCOL/32.0−1/64.0. The southeast corner is determined by Latitude=ROW0−(WROW+WRCNT)/32.0)−1/64.0, and Longitude=COL0+(WCOL+WCCNT)/32.0+1/64.0. It is valid for WRCNT and/or WCCNT to be 0. In the case that both are 0, the corners define a bounding box that surrounds one warning cell.

The WID field in FIG. 14 contains a numeric code for the warning type corresponding to the table set forth in FIG. 13. The CANC flag indicates that this data item specifies an area where any existing warning for WID has expired or otherwise been canceled.

A warning data message can contain multiple warning data items (for example, 1-120). The numbers of items per message is determined by the transmitting server. A smaller number per message improves latency of other high priority warnings, while a larger number per message reduces loss of bandwidth due to message encapsulation overhead. An exemplary format of a warning data message is shown in FIG. 15.

The remote systems 15 may expire warnings. For example, receipt of a warning data message with the CANC flag set may be used to clear warnings. Additionally, warnings are preferably repeated periodically. If a warning is not refreshed within some specified amount of time, then the warning may be cleared. This "auto-clear" time is preferably long enough to allow more than one chance to receive current warning status so that reception errors are less likely to cause false clearing.

City Forecasts

Weather data messages may also include data for specific locations, for example, selected cities. In one embodiment, the forecasts are associated with a specific cell that corresponds to a particular city. The forecast could include current temperature and conditions, and a forecast for the next few days. Forecast information could include, high and low expected temperatures, percentage of precipitation, and sky conditions (for example cloudy, partly cloudy, or sunny). The forecasts may be broken down by 12 hour periods. City forecast data may reside in the remote unit's memory for retrieval by a user request rather than being displayed automatically. For example, the user may select from a menu specific city forecast information they desire.

Weather data messages containing one or more of (1) environmental data matrix consisting of weather conditions, road conditions, and specific hazards; (2) storm location data; (3) warnings/watches data; and (4) city forecasts, may be transmitted using those methods known in the art, and similar to that outlined for the data described in Table 1.

In one embodiment, transmitted messages may be encapsulated in some form to be comparable with other messages from other sources being received by the specific remote systems 15. The weather system byte stream can be arbitrarily packetized for delivery, as long as the packets are delivered in the same order. In one embodiment, all four message types can be sent. In other embodiments, subsets can be sent. For example, just the matrix data could be sent, or the matrix data and storm data could be sent. An exemplary embodiment of possible weather data messages is depicted in FIG. 16.

As disclosed in FIG. 16, some special character sequences may be used to delimit the messages in the transmitted messages. The sequences in this embodiment start with 0xE9 (referred to as E9). The sequences are (1) SYNC: E9 XX, where XX is not 0x00, 0x01, or 0xE9, beginning of message; (2) ESC: E9 00, sequence sent to avoid appearance of SYNC in message body; and (3) EOM: E9 01, optional end of message. When a new message is ready to be sent, it is preferably analyzed to find some byte value that does not appear in the message. This value should not be 0x00, 0x01, or 0xE9 in this embodiment. If no suitable value can be found, then the least frequently occurring value in the message is chosen. This becomes the XX value for the current message. Then the following stream can be sent: SYNC<modified message body><EOM|SYNCnext>. The modified message body is the original message, except that any occurrences of the byte XX have been replaced with E9 00 (ESC). EOM can be used if there is not another message ready for transmission. It will often be the case that another message is ready, so EOM is not needed. However, since there is no run length field built into this embodiment of the message, EOM may be used to terminate a message when there is temporarily no more data.

The message body is preferably prefixed by a message header of one byte. The upper 4 bits of the header may contain the message ID, and the lower 4 bits can be considered an extension of the message body. In particular, the lower 4 bits are used in the matrix Column message and contain the upper bit of the 9 bit column number (COL).

For the exemplary embodiment disclosed in FIGS. 9-16, except the different types of weather data messages created and their format, the data is processed by the matrix encoder 11, transmitted by distribution network 13, received and processed by the remote systems 15 in a manner similar to that disclosed with respect to the embodiment depicted in Table 1. For this embodiment, as will be appreciated by those of skill in the art, the matrix encoder 11 and matrix decoder 304 may be configured to process the different data formats.

After at least a portion of the processed meteorological data matrix is constructed, the information can be distributed by the distribution network 13 to the remote systems 15 via weather data messages. The weather data messages are preferably formatted in a manner that makes transmission, reception, and decoding easy. The matrix data may be transmitted in a variety of formats. However, the weather data messages should preferably use minimal bandwidth. It should be recognized that "weather data messages" may include information that is not meteorological information, for example, road conditions, road closings, or other environmental condition data discussed above.

Wireless Transmitter Coverage Area Embodiment

In one alternative embodiment, the present invention provides a method and system for the distribution of environmental data to remote users based upon their location within the communication range of a wireless transmitter. In the preferred embodiment, the environmental condition data comprises meteorological data. The exemplary embodiments discussed below utilize primarily meteorological data, but the present invention can also receive, process, and distribute other environmental data discussed above, for example, road conditions, traffic updates, air quality, disasters, law enforcement activities, airport delays, etc.

Figure 17:
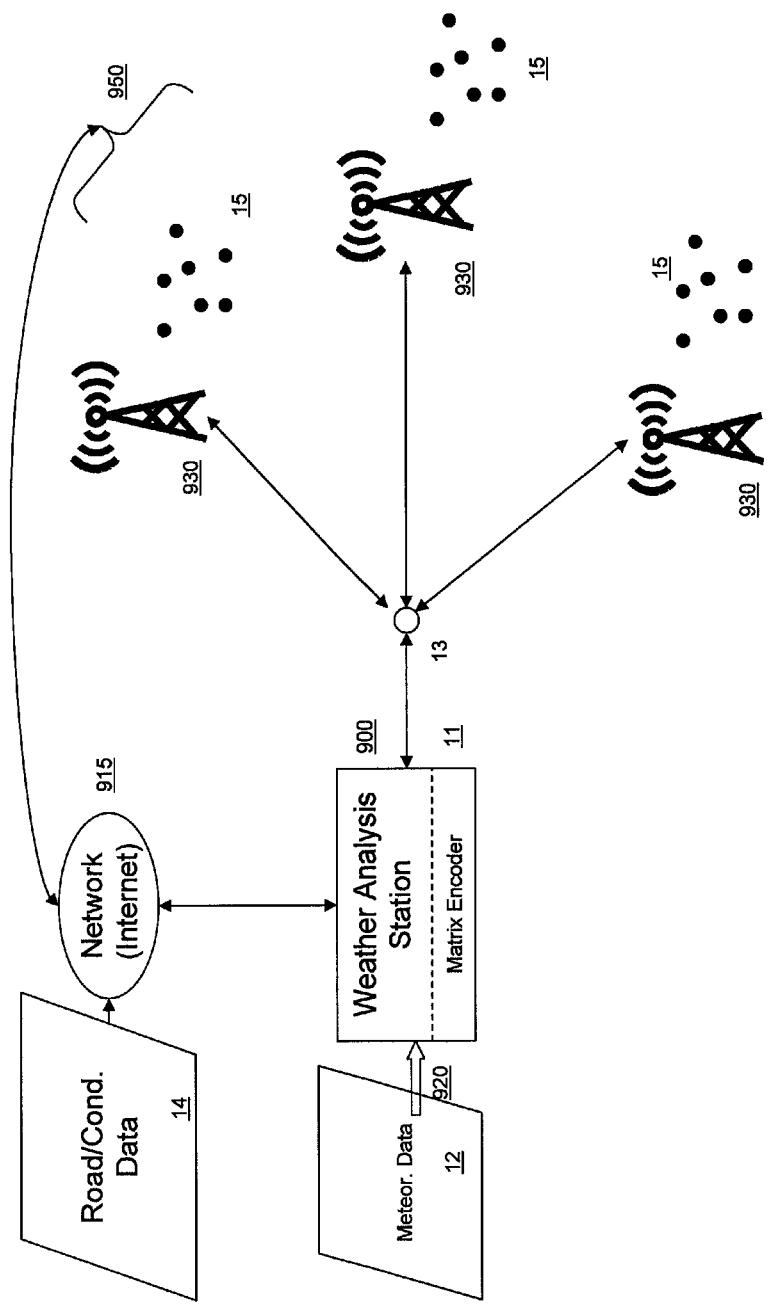
FIG. 17 is a schematic representation of the system of one alternative embodiment of the present invention.

In one exemplary embodiment, depicted in FIG. 17, the present invention comprises a weather analysis station 900 comprising one or more computer-based data processing and storage systems, including a matrix encoder 11, coupled to a distribution network 13. The weather analysis station 900 receives data from one or more data sources, for example, meteorological data 12 and/or road status/condition data 14, through a communications network 915, such as the Internet, or via a direct communications link 920. The matrix encoder 11 of the weather analysis station 900 processes the received meteorological data and creates weather data message(s), derived from the processed meteorological data, to be distributed to one or more of the wireless transmitters 930, via the distribution network 13. The wireless transmitters 930, in turn, transmit the weather data message(s) to the remote unit(s) 15 within its communication range. The wireless transmitters 930 may be cellular phone towers, wi-fi or super wi-fi data transceivers, or any other known or to-be-developed wireless transmitter having a communications range. Generally, a "wireless transmitter" can be any type of device or system that can send and/or receive signals of data without being connected by wire to a remote receiver. The weather data message(s) are received by the remote unit(s) 15 within the communications range of the wireless transmitters 930. The remote systems 15 may be, for example, a cellular telephone with or without GPS (global positioning system) capabilities, and with or without internet connectivity. The remote system 15 may also be personal digital assistants, handheld computers, notebook computers, other computers responsive to localized data transceivers, or any other device or system capable of receiving the signal from the transmitter. Each remote device 15 is normally in the custody of, controlled by, or reportable to one or more persons, referred to as users herein, but may also be non-person controlled, i.e., automatic units.

Figure 19:
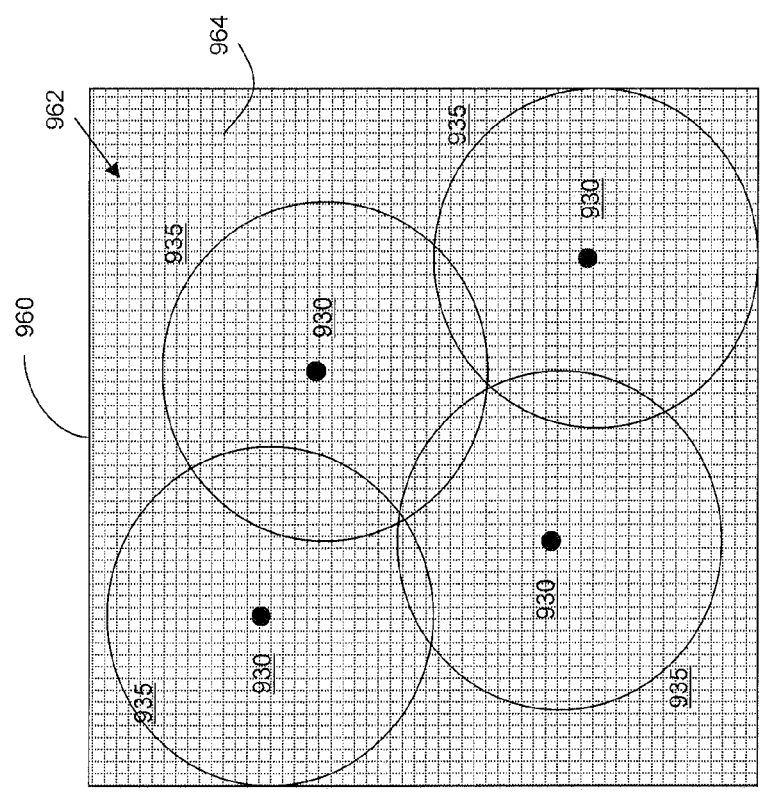
FIG. 19 is a diagram showing the communication ranges of a plurality of wireless transmitters laid over within a geographic area that has been divided into a grid of individual cells.

In the preferred embodiment, the geographic area to which the meteorological data is associated may be divided into a grid, comprising a plurality of cells. An exemplary embodiment is depicted in FIG. 19, showing the subject geographic area 960, divided into a grid 962 comprising numerous cells 964. The subject geographic area 960 could be very large, for example, the continental United States, or small, for example, a ten square mile area, or smaller. The size of the individual cells is configurable, for example, 1 Km×1 Km, or 5 Km×5 Km. The size and geographic location of each cell 964 may be stored in a database.

The cells 964 typically will be of a regular shape, but given certain geographical or topographical features, one may define the cells of irregular or dissimilar size or shape to accommodate such features. For example, in an area with a valley abruptly terminating into a steep mountain, it may be desirable to have smaller cells corresponding to the mountainous terrain to accommodate weather events that change with altitude, while the cells corresponding to the valley may be larger as the weather patterns may be less volatile over such an area. Likewise, the size of the cells 964 may be set to correspond to the resolution of the meteorological data received from the data sources 12, 14, or to the communications range of the wireless transmitters, or to the density of the wireless transmitters within the geographical area.

Also depicted in FIG. 19 are a plurality of wireless transmitters 930, each having a communications range 935. As described further below, the grid cells 964 may be associated with the communication range(s) 935 of a wireless transmitter(s) 930 located within the broader geographic area 960 to which the received meteorological data pertains. In other words, grid cells 1-20 may be associated with Transmitter #1, grid cells 21-40 may be associated with Transmitter #2, etc.

With respect to this embodiment, the matrix encoder 11 of the weather analysis station 900 processes the meteorological data received from the data sources to generate "reporting data." In one embodiment, reporting data comprises a meteorological data matrix for the subject area 960, i.e., the meteorological conditions for each individual grid cell 964. For example, the meteorological data matrix for a particular grid cell may be of the type depicted in Table 1. The reporting data may also be in the form of storm location data, warnings data, city forecasts, and the like, discussed above. Reporting data may or may not be filtered for identification of "threshold data" discussed below.

The reporting data may also comprise an aggregate weather data product indicative of meteorological conditions for all, or a subset of, cells within a particular wireless transmitter's communications range 935. This aggregate weather data product may be created by analyzing the weather conditions across all cells within a transmitter's communications range 935 and reporting the cumulative, predominant, average, and/or most important weather events in that region. For example, if a transmitter's communication range includes cells 1-20, and cell 1 includes a severe thunderstorm and cell 5 contains a tornado, the aggregate weather data product may only report the predominate weather event, the tornado in this example. Alternatively, the aggregate weather data product may report both a severe thunderstorm and a tornado.

The reporting data may be filtered to identify only "threshold" meteorological conditions that exist, or may soon exist, in a particular area. In this embodiment, preferably prior to constructing and sending the weather data messages, the reporting data is further processed, i.e., filtered, to determine if it constitutes or contains a condition worthy of reporting. For example, clear skies for an individual cell, or for grid cells 1-20, may not constitute a "threshhold" meteorological condition. The reporting data may also constitute the presence or non-presence of a particular condition, i.e., ice, snow, hail, rain, tornado, etc.

The weather data messages are derived from the reporting data, and are constructed in a manner appropriate for transmission to, and by, the wireless transmitter. The technical format and specifications for a particular weather data message may depend on the transmission medium, and would be understood by those of skill in the art. The data contained in the weather data messages may also be in various formats. For example, the weather data messages may comprise the meteorological data matrix discussed above, an aggregate weather data product, a text message, an audio message, an image file, or any combination thereof.

As an example of a message comprising a meteorological data matrix, the meteorological data matrix could include data that grid cell 1 has heavy rain, small hail, low visibility, and a NWS severe thunderstorm warning, that grid cell 2 has light rain, large hail, low visibility, and a tornado warning, etc. As an example of a message comprising an aggregate weather data product, the aggregate weather data product could include data that grid cells 1-20 have heavy rain, large hail, a NWS severe thunderstorm warning, and a tornado warning. As an example of a message comprising a text message, the text message could simply read "A severe thunderstorm warning and tornado warning have been issued for your area." As an example of a message comprising an image file, an image of the immediate area showing the radar reflectivity and potential storm tracks for an area could be transmitted.

After receiving the weather data messages, the wireless transmitter 930 may then automatically transmit the weather data messages over its communications range 935, where this data is received by responsive remote systems 15 within its communications range 935. Alternatively, the wireless transmitter 930 may be configured to further process and filter the weather data messages and send out only weather data messages, or modified weather data messages, applicable to its communications range 935. This may be necessary if the wireless transmitter 930 receives data for geographic areas different from the geographic areas covered by its communications range 935. For example, if Transmitter #1 receives weather data messages for cells 1-20, 21-40, and 41-60, and Transmitter #1's communication range only covers cells 1-20, it would process and filter the weather data messages, and only transmit the weather data message(s) for cells 1-20.

As described further below, a remote unit 15 may be configured to automatically report received weather data messages (i.e., either display them to the user or provide a notification that a message has been received), or to further filter received weather data messages and only report certain conditions based upon certain predetermined reporting criteria of the remote unit 15. If the user of a remote unit 15 desires more information regarding the weather event, and the user's remote device 15 is capable of two-way communication, the user may request additional information, via the wireless transmitter 930, from which the remote device 15 received the data, or more generally through an interface 950 to a communications network (internet) 915. Such request may be routed to the weather analysis station 900, which is responsive to provide additional information to the requesting remote device 15 on the subject weather event.

Figure 18:
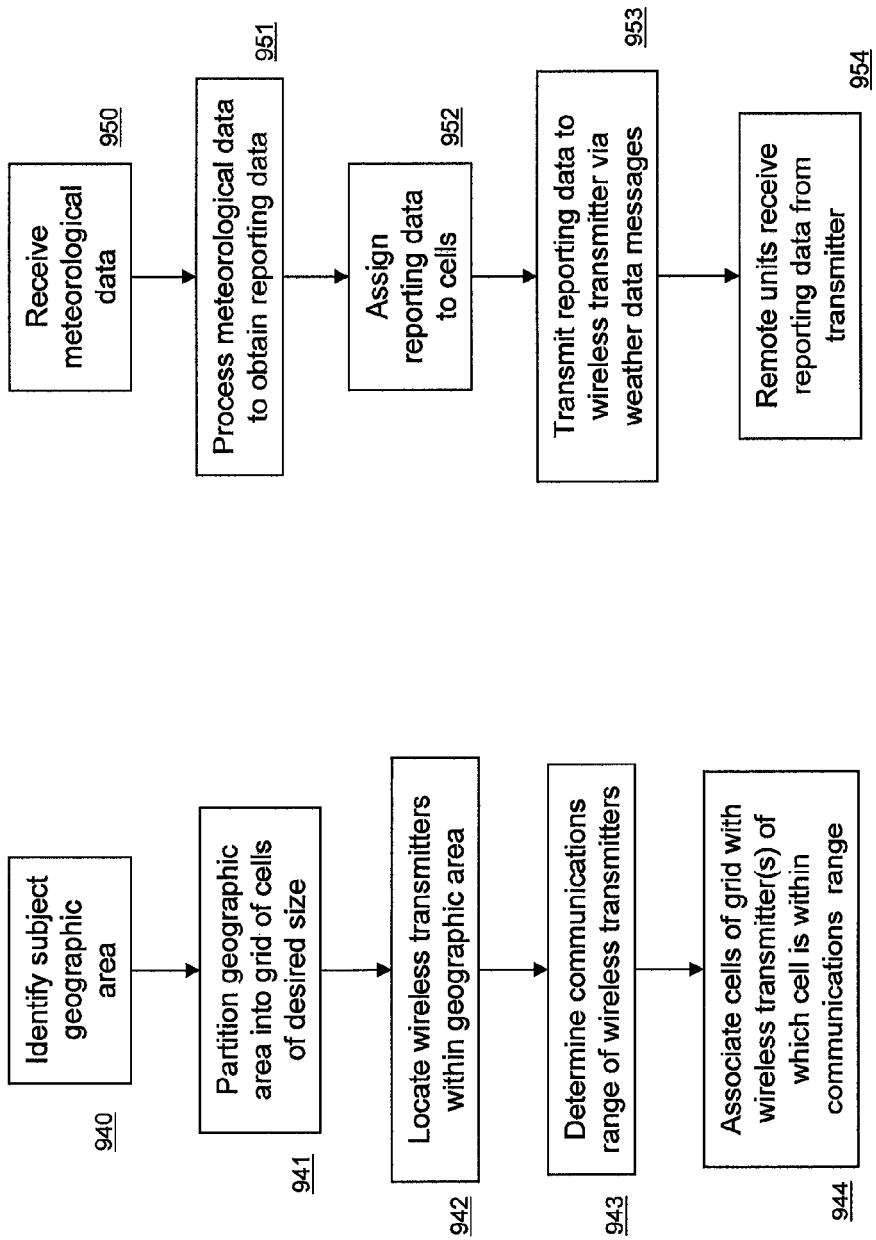
FIG. 18 is an exemplary flow chart of a portion of the method and system disclosed in FIG. 17.

FIG. 18 illustrates one exemplary embodiment of the process of partitioning the geographic area into a grid of cells, and associating each such cell with a wireless transmitter(s), the communications range of which at least a portion of the cell falls within. In step 940, the subject geographic area 960 (depicted in FIG. 19) is defined. In step 941, the geographic area 960 is divided into a grid 962 (see FIG. 19) comprising numerous cells 964 (see FIG. 19).

In step 942, the physical location of the wireless transmitters 930 within the geographical area 960 is determined. These locations are generally known or publicly available. In step 943, the communications range 935 of each wireless transmitter 930 is determined. This may be accomplished empirically, or by making estimates, statistical modeling, or assumptions based upon the particular hardware of the wireless transmitters. The communications ranges 935 are shown in FIG. 19 as circles of uniform size for simplicity and by way of example. In any given real-world set of conditions, the communication ranges 935 may be of irregular shape and size. This may be caused by variations in topography, the type of transmitter used, the directionality of its signal, the amount of power used to broadcast the signal, or any combination of such factors. As will be understood by those of skill in the art, the present system and method does not require all steps to be performed, for example, step 943 could be eliminated for embodiments where the data for all cells is distributed to the wireless transmitters 930 and/or the remote units 15 for processing.

Referring to FIG. 18, in step 944, each individual cell 964 of the grid 962 is associated with one or more wireless transmitters 930, the communications range of which at least a portion of the cell falls within. That is, as shown in FIG. 19, the cells falling within the range 935 of a given wireless transmitter 930 are associated with that particular wireless transmitter. And, as shown in FIG. 19, it may often be the case that the communication ranges 935 of adjacent wireless transmitters 930 overlap. Cells that are covered by more than one communication range 935 may be associated with one or more of the applicable wireless transmitters 930. The location and/or identity of the wireless transmitter 930 with which each cell is associated may be stored in a database. Other methodology can be used, but it is preferable to know what cells are associated with a particular wireless transmitter coverage area 935 and transmitter 930. If the cells are not associated with a particular wireless transmitter, data for all cells will likely be distributed to the remote units 15 for processing.

FIG. 20 illustrates an exemplary process of receiving, processing, and communicating meteorological data. In step 950, the weather analysis station 900 receives meteorological data from one or more sources as described above.

In step 951, the weather analysis station 900 (and in particular the matrix encoder 11) analyzes and processes the received meteorological data 12 to obtain reporting data. In this step, the weather analysis station 900 may combine data from various data sources and employ known procedures or algorithms to eliminate or reconcile inconsistencies in the data received from different weather sources.

In step 952, reporting data is assigned to the particular cells affected by the meteorological data. Thus, the meteorological data relevant to each cell is determined. In assigning reporting data to cells, the predicted path and location of meteorological phenomena at some time in the future can be taken into account using the systems and processes known in the art. For example, U.S. Pat. No. 6,125,328 discloses a system and method for predicting future storm locations using NEXRAD attributes. Thus, a first cell may have data assigned that indicates high winds, heavy rain, that it is under a National Weather Service Thunderstorm Watch, and a tornado is expected in 5-10 minutes; a second cell may have data assigned that indicates lightning, high winds, heavy rain, a hail storm, that is under a National Weather Service Thunderstorm Warning, and a tornado is expected in 10-15 minutes, and so forth.

Preferably, either during step 951, analyzing and processing meteorological data, or during step 952, assigning reporting data to cells, using pre-defined criteria, the system filters the reporting data to determine what parts of the data, if any, to report to the users ("threshold data"), i.e., the data that according to predetermined criteria should be broadcast to users. For example, given that the receipt and reporting of data to a user consumes battery power on the user's remote device 15, such criteria may provide that clear sunny skies with a light breeze is not a threshold data worth reporting to the user. Further, such criteria may provide that static weather should be reportable only periodically, or that threshold data exists only at a change in weather conditions. For example, there typically would be no need to report steady, light rain conditions repeatedly in a short time period. However, when steady-state light rain conditions are expected to change to severe rain, threshold data may be deemed to exist. Along these lines, such criteria may provide that threshold data "exists" for a given area when a particular event is forecast to occur within or reach the area within a given timeframe. In other words, the system and method of the current invention is not limited to reporting real time weather information, but includes the reporting of impending or forecast weather events for a given geography. As used herein, the term "exists" as used with respect to a weather event or condition should be understood to include real-time and impending or forecast weather events. It should be noted that the analysis of threshold data may be performed at a later stage.

As discussed above, if there is just light rain in a cell, or just a thunderstorm watch, nothing may be reported. In one embodiment, a weather data message is generated only for those cells in which threshold data exists. The weather data message is then distributed through the distribution network 13 to the appropriate wireless transmitter 930 for distribution to all remote units 15 within its coverage area 935. Weather data messages may simply be a text message, for example, "thunderstorm warning issued for area", "expect a dangerous twisting storm within 5 minutes", or "icy roads possible", just to name a few. One advantage of generating a text message as the data package is that a specialized application is normally not required to reside on the remote unit 15 and no further processing of the meteorological data is required by the remote unit. Many remote units, for example, many cell phones already have the capability to receive and display text messages.

Weather data messages may include more detailed information, for example, the reporting data assigned to each cell, or an aggregate weather data product. The reporting data for each cell may also contain data indicative of the geographic location of the cell. The reporting data, however, is not targeted at a particular user based upon a user's telephone number, user identification, profile, address, etc. Rather, the reporting data is targeted at any person or user within the communications range of the wireless transmitter to which the reporting data will be sent.

As described above, each cell 964 in the grid 962 is preferably associated with at least one wireless transmitter 930, the communications range of which at least a portion of the cell falls within. Thus, referring to FIG. 20, in step 953, the reporting data associated with a given wireless transmitter is communicated, via weather data messages, to that wireless transmitter 930, for further distribution over its communications range 935. In step 954, the remote units 15 responsive to receive data and within the communication range, receive the reporting data, via weather data messages, from the wireless transmitter 930. The transmission is indiscriminate, i.e., the transmission, as with the reporting data in general, is not user-specific.

Figure 21:
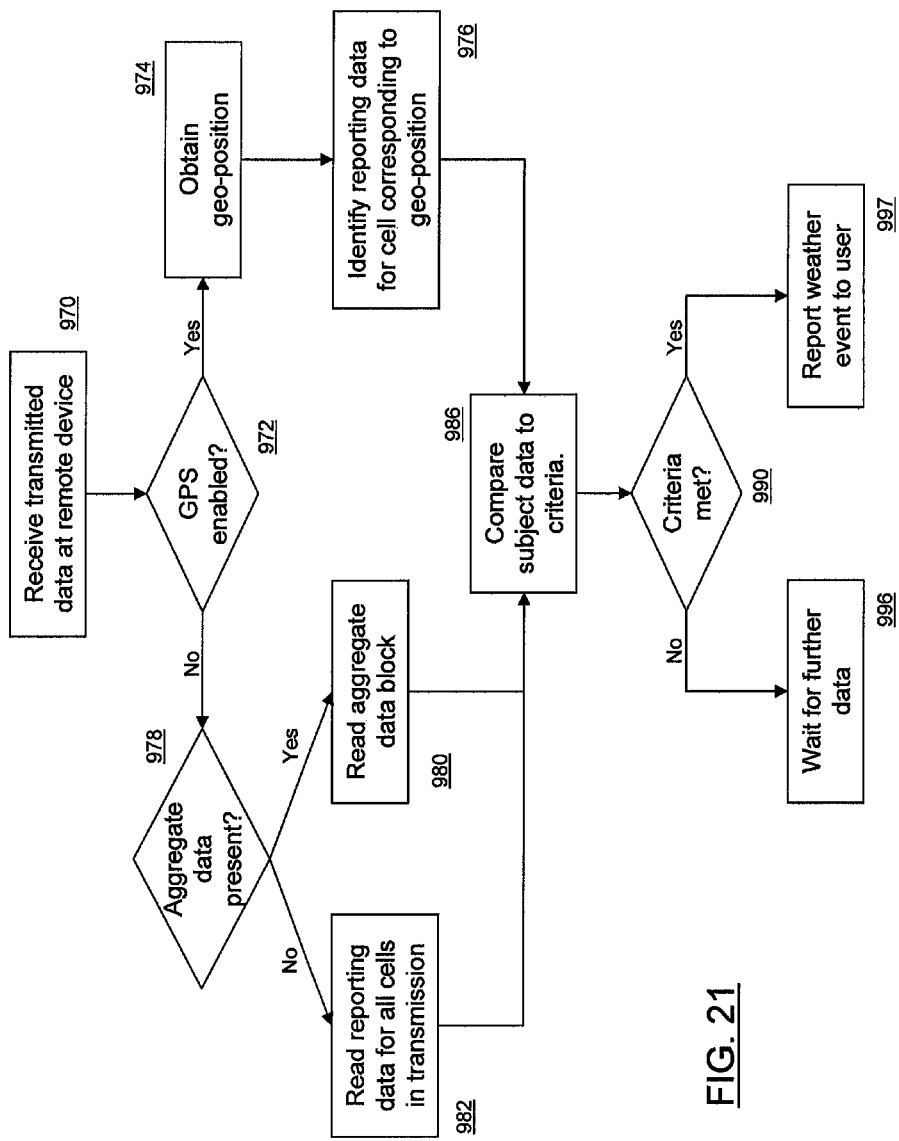
FIG. 21 is an exemplary flow chart of a portion of the method and system of one embodiment of the present invention.

FIG. 21 is an exemplary flow chart of a portion of one embodiment of the present invention. In FIG. 21, a remote unit 15 (in step 970) receives the weather data message (containing reporting data) transmitted by the wireless transmitter 930 in its proximity. In one embodiment, the remote unit 15 contains software (or firmware, or chipware, or other computer instructions or capabilities) with instructions to cause the unit to analyze and if necessary, act upon the received reporting data. The application on the remote unit remains "asleep" until a transmitter 930 having a coverage area that includes the current location of the remote unit transmits a weather data message related to the area. This preserves operating power in the remote unit 15. Some remote units 15 may contain a global positioning system (GPS) receiver, or other geo-location device, that allows the unit to receive signals from a satellite system and determine the unit's geographic position with a high degree of precision. Other remote units 15 may not have a GPS system, and it is possible that the user of a GPS-capable remote unit may have disabled GPS to save operating power or for some other reason.

Upon receiving weather data message from the wireless transmitter, the remote unit 15 in step 972 verifies whether GPS, or other geo-location device, is present and enabled. If so, the unit proceeds to step 974, in which it utilizes the geo-locating system to obtain its current geographic position. If the unit 15 is unable to obtain a current geographic position because of a communications problem or some other failure, the unit may optionally use the last-determined geographic location or exit the location-based data analysis routine and perform the data analysis in the same manner as a non-GPS enabled device. Upon obtaining its current geographic location, the remote unit 15 in step 976 analyzes the reporting data in the weather data messages, which preferably includes the geographic location of the cell, and identifies the reporting data for the cell corresponding to the remote unit's current geographic location. With the most geographically relevant and specific data identified, the remote unit 15 proceeds to step 986 in which it compares the content of the reporting data to the user's predefined reporting criteria, as described below.

It should be noted that the reporting data may include data for each cell (i.e., weather data matrix), it may be an aggregate data product, a text message, image file, or any combination of the foregoing.

Returning to step 972, if the remote unit 15 does not contain a GPS system, or an onboard GPS system is not enabled, the remote unit 15 proceeds to step 978. Depending on the content of the weather data message, the transmitted data received by the remote unit 15 may be reporting data for individual cells, it may also include an aggregate weather data product for weather conditions in the wireless transmitter's communications range, or both. In step 978, the unit 15 analyzes the received data to determine if an aggregate weather data product is present. If so, the remote unit 15 in step 980 reads the aggregate weather data product. If the received data does not contain an aggregate data product, the remote unit 15, in step 982, reads the reporting data for all cells contained in the transmission. The remote unit 15 then processes the data to construct a proxy for the aggregate weather data product, and which preferably will include the worst or most severe of the weather conditions reported across all the cells for which reporting data was provided in the transmission.

In step 986, the remote unit 15 compares, i.e., filters, the relevant data, as determined by or resulting from the above processes, to the user's predetermined criteria. Because such data may be reporting data for an individual cell (in the case of a GPS-enabled device), the aggregate data product created and transmitted by the weather analysis station, or a proxy for the aggregate data product created by the remote device from its own analysis of the reporting data, the data that is compared to the user's pre-determined criteria is referred to as "subject data" in block 986 of FIG. 21. If the criteria is met (block 997), data is reported to the user. If the criteria is not met (block 996) nothing is reported, and the remote unit 15 waits for further data. In an alternative embodiment, the remote unit might compare the reporting data to the predetermined criteria when it is initially received.

The user-defined criteria may include, for example, time of day, type of weather event, or severity of the weather event, and any combination thereof. By way of further example, the remote unit 15 may be configured not to report any weather condition except a tornado warning after 10 p.m. Or the remote unit could be configured to report rain advisories between 6 a.m. and 6 p.m., but only severe thunderstorm warnings from 6 p.m. to 10 p.m.

The remote unit 15 may further be configured to specify the type of report desired (e.g., text, graphical, voice) and the type of notification, either generally or based upon the specific type of weather event. For example, the remote unit 15 may be configured so that all weather events, except tornado and severe thunderstorm warnings, be provided by text message accompanied by a vibration, while tornado and severe thunderstorm warnings be provided in a graphical form showing direction of the storm accompanied by a high-volume audible alarm that repeats until silenced by the user. Any myriad combination of such reporting and notification preferences may be enabled. The remote unit 15 may be configured using an application residing on the remote unit 15 itself. Alternatively, a user could enter its used-defined criteria on a web-site and have those criteria downloaded to the remote unit 15.

The system and method can be configured to provide varying levels of service to end users. For example, there could be multiple levels of service, with more comprehensive data available for increased cost. Just as an example, the system can be configured for the following service levels:

Basic—National Weather Service Warnings and Short Message Service (SMS) text messages Basic Plus—Basic service plus additional third party weather service provider advisories via text and voice Standard—Basic Plus service, with additional supporting graphics/lapses, and forecasts Pro Package—Standard service plus radar, satellite, other location information, and specialized graphics The reporting data may optionally include a provision for the user to obtain more information on the given weather event, if desired. Thus, as shown in FIG. 17, the users of the remote devices 15 may engage in two-way communications with the weather analysis station 900 via wireless transmitters 930 or via another communications network 915, such as the Internet. In response to this data request from a user of a remote device 15, the weather analysis station 900 may provide additional information on weather conditions in the user's geographic location. For example, the reporting data may include a telephone number to a recorded message, a URL that identifies a web-page or other resource from which the user may obtain additional information. The URL may be coded geographically such that the weather analysis station 900 can determine the location of a remote device requesting additional information. In the case of telephone communications, the responsive system at the weather analysis station 900 requests the user to provide its zip code or other location-identifying information via touch-tone data entry, thus determining the user's location and providing geographically specific weather information. Such information could include a radar images and/or predicted storm paths.

For remote devices 15 without GPS capability, if the reporting data meets the user's pre-determined criteria, it is "reported" by the remote device. In other words, even if a wireless transmitter contains a grid having twenty individual cells, reportable data in any one of the cells may result in the condition being reported. Due to the size of the coverage area for many wireless transmitters being relatively small, this will still result in relatively site-specific reporting of data.

For remote devices with GPS capability, as discussed above, additional processing may assist in more site-specific reporting. In one embodiment, the remote device 15 compares its cell location with the reporting data. If the cell in which it resides did not have corresponding reporting data, then nothing is reported to the user. For example, assume wireless transmitter coverage area includes cells 1-20, with the remote unit in cell 15. If a tornado is reported in cell 1, and predicted to affect cells 2, 3, and 4 (but not 15), the tornado may not be reported to the user in this embodiment. Thus, for remote units with GPS or other geo-location capability, the data can be very site-specific.

For remote units 15 having GPS capability, the system can also take into account the predicted location of a remote unit 15 based on its location and movement. For example, if a remote unit is currently in a cell, but is moving west (for example, riding in a car), the system may predict that the remote unit 15 will be in the cell directly to the west of the current cell in a few minutes, and will report data according to that cell when appropriate. The predicted location of a particular remote unit, and the reporting data that may be applicable to its predicted location, may be further understood with respect to FIG. 8 and corresponding discussion above.

In one embodiment, remote units 15 can receive and display current conditions and forecasts for the wireless transmitter coverage area 935. This can be done using "pull" technology where the user requests the information be retrieved from the weather analysis station 900 or using "push" technology where the data is transmitted to and resides on the remote unit 15, and updated as appropriate. Thus, this information may be viewed by a user at any time. Examples include forecasted conditions for a particular cell over the next 24 hours, i.e., high and low temperatures, sky conditions, percentage of precipitation, etc.

In one embodiment, the system could provide for a specialized tone upon receipt of a message pertaining to a user's location. For example, one tone could be used for tornado alerts, another for hail alerts, and another for thunderstorm alerts. The message could be automatically displayed (for example, for a text message), or the user could elect to ignore or display the message. Messages can be in the form of text, audio messages, or perhaps visual displays showing current weather conditions, for example, radar images (including loops/lapse), and potential storm movement and predicted paths.

In an alternative embodiment, the present invention can track which remote units 15 are within the specific coverage area of a particular wireless transmitter 930, without having to track its exact location. For example, various cell phone providers have the capability to identify the cell phone transmitters to which a particular cell phone is tied. In this embodiment, a database can maintain such information and corresponding messages prepared directly for the cell phones within a particular transmitter coverage area through a private gateway using SMS (or by a direct call to the cell phone number). This is possible because the cell phone providers also maintain a database of each address for each cell phone to which text messages may be sent. Thus, in this embodiment, no processing of the data is required by the remote unit other than receiving and displaying the text message.

In another embodiment, the weather analysis station 900 receives the meteorological data and identifies an existing storm and its predicted path. The weather analysis station 900 generates a boundary area defining the predicted path of the storm and transmits a weather data message containing the boundary area to the wireless transmitter covering the affected area for distribution to all remote units 15 within its coverage area 935. For remote units 15 with GPS capability, the remote unit determines its current location and compares its location to that of the boundary area. If the current location falls outside of its boundary area, nothing is reported. In this embodiment, the data may not be assigned to particular cells, but rather is location based. If the location of the remote unit 15 falls within the boundary area, the user will be notified accordingly.

In one embodiment, a weather data message is created by the weather analysis station 900 for a particular wireless transmitter coverage area 935, and a single weather data message is transmitted to all remote units 15 in the coverage area 935. Alternatively, a weather data message may include reporting data assigned to all cells within the communication range 935 of a particular wireless transmitter 930, and the weather data message distributed to the remote wireless transmitter 930 for distribution to remote units 15 within its coverage area. In this embodiment, additional processing may be performed by the remote unit 15 to determine if the weather data message is relevant to its location. In yet another embodiment, a weather data message(s) may include reporting data assigned to all cells of a particular geographic area (i.e., not limited to the cells within the communications range of a particular wireless transmitter), and the weather data message(s) for all cells distributed to the remote wireless transmitter 930. In this embodiment, further processing is performed at the wireless transmitter 930 and only the data related to its coverage area is distributed to the remote units in its coverage area. For example, a wireless transmitter 930 may receive data for cells 1-200, but may only provide coverage for cells 1-20. Thus, in this embodiment, only data related to cells 1-20 would be distributed for its coverage area. The present invention can be configured in many different ways to accomplish the same reporting of site specific information. For example, the reporting data for all grid cells can be broadcast to the wireless transmitters for retransmission to the remote units. In this case, further processing is required at the remote unit to determine if the reporting data is relevant.

Unlike many prior art systems, the disclosed invention does not require the direct user contact information, for example a cell phone number or a pager number. Rather, all users within a particular coverage area may indiscriminately receive the data applicable to a particular coverage area. Moreover, for some embodiments, the location of the remote unit is not needed in order to receive and process environmental condition information that may be relevant to the remote unit, i.e., if it receives data from a cell tower that broadcasts to its location, the environmental condition information is relevant to it. Additionally, for some embodiments, by selecting a cell tower to which to send data and/or comparing the cell tower grid to the weather data grid, the information can be efficiently distributed to the applicable users.

While the foregoing exemplary embodiments are described with respect to meteorological data, the present invention is equally applicable for use with any environmental condition data. In this context, weather data messages would be replaced with environmental data messages, aggregate weather data product replaced with aggregate environmental data product, meteorological data matrix replaced with environmental data matrix, etc.

Some the components of the above-described system may be implemented with computers. A computer may be any microprocessor or processor (hereinafter referred to as processor) controlled device, such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker.

The computer may be a uniprocessor or multiprocessor machine. Additionally, the computer includes memory such as a memory storage device or an addressable storage medium. The memory storage device and addressable storage medium may be in forms such as, by way of example, a random access memory (RAM), a static random access memory (SRAM), a dynamic random access memory (DRAM), an electronically erasable programmable read-only memory (EEPROM), a programmable read-only memory (PROM), an erasable programmable read-only memory (EPROM), hard disks, floppy disks, laser disk players, digital video disks, compact disks, video tapes, audio tapes, magnetic recording tracks, electronic networks, and other devices or technologies to transmit or store electronic content such as programs and data.

The computer executes an appropriate operating system such as Linux, Unix, Microsoft® Windows® 95, Microsoft® Windows® 98, Microsoft® Windows® NT, Apple® MacOS®, IBM® OS/2®, and Palm® OS, and embedded operating systems such as Windows® CE or and the like. The computer may advantageously be equipped with a network communication device such as a network interface card, a modem, or other network connection device suitable for connecting to one or more networks.

The computer, and the computer memory, may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present invention. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also he understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in nonvolatile memory, such as, by way of example, read-only memory (ROM). In some embodiments, features of the present invention can be implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

The computer used to implement the remote system, or the elements thereof, may be an embedded microprocessor. For example, a car radio or dashboard navigation or entertainment system could also comprise an embedded microprocessor configured with control logic as described above to execute the functions of the remote system. The output/display system could then be the radio or entertainment system speakers, or the navigation system visual display. Control of the remote system may be achieved by making the radio or navigation system buttons multipurpose.

As described above and shown in the associated drawings, the present invention comprises an apparatus for a system for providing weather and road and environmental condition alerts to wireless remote devices and related method. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A system for distributing weather information to remote users, the remote users having unknown specific geographic locations comprising a computer system configured with processor readable instructions to:
   (a) receive and process meteorological data related to a geographic area to,
      (i) generate reporting data according to a meteorological data matrix comprising a plurality of grid cells each having a geographical location that categorizes the reporting data into different types of meteorological phenomena, and
      (ii) filter the reporting data to determine the grid cells having meteorological threshold reporting data, said filtering step comprising comparing said reporting data to a pre-defined criteria such that if the reporting data satisfies the pre-defined criteria the presence of meteorological threshold reporting data is affirmatively determined,
   (b) identify, if the presence of meteorological threshold data is affirmatively determined, one or more cellular telephone transmitters having a geographical communications range that overlaps with the geographical location of the grid cells having meteorological threshold reporting data,
   (c) derive a weather data message specific to the identified cellular telephone transmitter from the threshold meteorological reporting data for the grid cells having a geographical location that overlaps with the communications range of the identified cellular telephone transmitter;
   (d) transmit the weather data message to the identified cellular telephone transmitter for transmission to all remote users within the communications range of the determined cellular telephone transmitter, wherein said remote users have unknown geographic locations within the communications range.

2. The system of claim 1 wherein the weather data message comprises a meteorological data matrix.

3. The system of claim 1 wherein the weather data message comprises an aggregate weather data product.

4. The system of claim 1 wherein the weather data message comprises a text message.

5. The system of claim 1 wherein the weather data message comprises a voice message.

6. The system of claim 1 wherein the weather data message comprises a push message.

7. A method for distributing meteorological data comprising:
   (a) receiving meteorological data for a geographic area;
   (b) processing the meteorological data to obtain reporting data according to a meteorological data matrix that categorizes the reporting data into different types of meteorological phenomena, the meteorological data matrix comprising a plurality grid cells each having a geographical location;
   (c) filtering the reporting data to determine the grid cells having meteorological threshold reporting data, said filtering step comprising comparing said reporting data to a pre-defined criteria such that if the reporting data satisfies the pre-defined criteria the presence of meteorological threshold reporting data is affirmatively determined;
   (d) identifying, if the presence of meteorological threshold data is affirmatively determined, one or more wireless transmitters having a geographical communications range that overlaps with the geographical location of the grid cells having meteorological threshold reporting data;
   (e) deriving a weather data message from the threshold reporting data for the grid cells having a geographic location that overlaps with the communications range of the identified wireless transmitter; and
   (f) transmitting said weather data message to the identified wireless transmitter for transmission over its communication range to remote users within the communications range, wherein said remote users have unknown geographic locations.

8. The method of claim 7 wherein the transmitter is a cellular transmitter.

9. The method of claim 7 wherein the weather data message comprises a meteorological data matrix.

10. The method of claim 7 wherein the weather data message comprises an aggregate weather data product.

11. The method of claim 7 wherein the weather data message comprises a text message.

12. The method of claim 7 wherein the weather data message comprises a push message.

13. The method of claim 7 wherein the weather data message comprises an image file.

14. The method of claim 7 wherein the weather data message is specific to the identified transmitters.

15. The method of claim 7 further comprising:
   transmitting the weather data message from the one or more wireless transmitters to remote units within the communications range of said one or more wireless transmitters;
   receiving the weather data message by the remote units within the communications range of the one or more wireless transmitters;
   comparing the weather data message to the remote unit's pre-defined criteria for reporting; and
   triggering the remote units to report if said weather data message meets the remote unit's pre-defined criteria.

16. The method of claim 7 further comprising:
transmitting the weather data message from the one or more wireless transmitters to remote units within the communications range of said one or more wireless transmitters,
receiving the weather data message by the remote units within the communications range of the one or more wireless transmitters; and
triggering the remote units to report that weather data message has been received.

17. The method of claim 16 wherein the remote units comprise at least one cellular phone.

18. The method of claim 17 wherein the report that a weather data message has been received comprises a ring tone.

19. The method of claim 17 wherein the report that a weather data message has been received comprises a vibration.

20. The method of claim 16 wherein the remote units comprise at least one wi-fi enabled device.

21. The method of claim 15 wherein the pre-defined criteria comprises the type of weather event.

22. The method of claim 15 wherein the pre-defined criteria comprises the time of day.

23. A mobile remote wireless unit for receiving and processing weather data comprising:
(a) a receiver baying an unknown geographic location within a coverage area of one or more wireless transmitters, said receiver configured to receive weather data messages from one or more wireless transmitters, the weather data messages containing geographic location information, wherein the geographic location information comprises the geographic location of one or more grid cells overlapping the coverage area of the one or more wireless transmitters and said geographic location information is independent of the receiver's unknown geographic location wherein the weather data messages are derived from reporting data specific to said one or more grid cells, and wherein the weather data message is specific to the grid cells overlapping the coverage area of the one or more wireless transmitters; and
(b) a computer system having memory configured with processor-readable instructions to (i) allow the remote unit to identify pre-defined criteria based in part upon the type and severity of a weather event characterized by a weather data message and (ii) filter the weather data message from the one or more wireless transmitters for the remote unit's pre-defined criteria for reporting and if the said weather data message meets the pre-defined criteria to trigger the mobile remote wireless unit to report that the weather data message has been received.

24. The mobile remote wireless unit of claim 23 wherein the weather data messages contain data indicative of the reporting data in the grid cells and further comprising a geo-location system that provides a geographic position of the mobile unit, and the computer system further configured to identify the reporting data for the grid cell corresponding to the remote unit's geographic location.

25. The mobile remote wireless unit of claim 23 wherein the computer system is further configured to specify the type of report.

26. The mobile remote wireless unit of claim 23 wherein the computer system is further configured to specify the type of notification.

27. The mobile remote wireless unit of claim 23 wherein the mobile remote wireless unit comprises a wi-fi enabled devices.

28. The mobile remote wireless unit of claim 23 wherein the unit's pre-defined criteria comprises the time of day.

29. The mobile remote wireless unit of claim 23 wherein the computer system is further configured to display the reporting data.

30. The mobile remote wireless unit of claim 23 wherein the computer system is further configured to display the weather data message that meets the pre-defined criteria.

31. The mobile remote wireless unit of claim 23 wherein the weather data message comprises a meteorological data matrix.

32. The mobile remote wireless unit of claim 23 wherein the weather data message comprises an aggregate weather data product.

33. The mobile remote wireless unit of claim 29 wherein the reporting data is a text message.

34. A method of providing meteorological information to one or more remote units located within the communications range of at least one of a plurality of wireless transmitters, said method comprising:
(a) receiving meteorological data pertaining to a geographic area;
(b) partitioning said geographic area into a geographic grid comprising a plurality of cells, said cells each having a geographical location;
(c) processing the meteorological data to generate reporting data for the cells;
(d) identifying one or more wireless transmitters having a coverage area containing the geographical location of the cells having reporting data;
(e) creating, if said reporting data meets certain pre-defined criteria concerning the type and severity of a weather event described by the meteorological data, a weather data message associated with the reporting data of the cells specific to the identified one or more wireless transmitters; and
(f) transmitting the weather data message to the identified one or more wireless transmitters for transmission to all remote units located within the communication range of said one or more transmitters, wherein location of said remote units within the communications range is not determined.

35. The method of claim 34, further comprising:
creating an aggregate weather data product indicative of the aggregate of reportable weather events for all cells associated with said at least one wireless transmitter, and transmitting said aggregate weather data product to said at least one wireless transmitter.

36. The method of claim 34, further comprising determining whether the weather data message meets the remote unit predetermined criteria wherein said predetermined criteria is at least one of time of day or type of weather event.

37. The method of claim 34, further comprising filtering the reporting data generated for the cells to determine threshold meteorological reporting data, wherein weather data messages are created if threshold meteorological reporting data exists.

38. The method of claim 34, wherein said weather data message includes the geographic location of the cell to which said reporting data pertains and further comprising the step of obtaining the geographic location of the remote unit and identifying the cell corresponding to said geographic location and comparing the reporting data for said cell to said geographic location of the remote unit.

39. The method of claim 34, wherein said weather data message further comprises a URL for providing additional information to said remote unit in response to a request by said remote unit directed to said URL over a communications network.

40. The method of claim 34, further comprising:
  filtering the reporting data to determine threshold meteorological reporting data; and
  determining if threshold meteorological reporting data meet the remote unit's predetermined criteria for reporting.

41. The method of claim 40, wherein the weather data message includes the geographic location of the cell to which said reporting data pertains, and further comprising:
  obtaining the geographic location of the remote unit; and
  identifying the cell corresponding to said geographic location and comparing the reporting data for said cell to said geographic location of the remote unit.

* * * * *